US011572200B2

(12) United States Patent
Gregory et al.

(10) Patent No.: US 11,572,200 B2
(45) Date of Patent: Feb. 7, 2023

(54) COUPLING ASSEMBLY FOR FLUIDLY CONNECTING FIRST AND SECOND SPACECRAFT AND A KIT OF PARTS FOR A COUPLING AND A METHOD OF FLUIDLY CONNECTING FIRST AND SECOND SPACECRAFT USING A COUPLING

(71) Applicant: Airbus Defence and Space Limited, Stevenage (GB)

(72) Inventors: Juliet Gregory, Stevenage (GB); James Sadler, Stevenage (GB); William Bentall, Stevenage (GB); Frederique Dupont De Denechin, Toulouse (FR); Henri Bavestrello, Toulouse (FR); Marc Manz, Bremen (DE); James Sheppard-Alden, Stevenage (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 17/598,959

(22) PCT Filed: Mar. 27, 2020

(86) PCT No.: PCT/GB2020/050840
§ 371 (c)(1),
(2) Date: Sep. 28, 2021

(87) PCT Pub. No.: WO2020/201733
PCT Pub. Date: Oct. 8, 2020

(65) Prior Publication Data
US 2022/0089301 A1 Mar. 24, 2022

(30) Foreign Application Priority Data
Mar. 29, 2019 (EP) .................................... 19275037

(51) Int. Cl.
*B64G 1/40* (2006.01)
*F16L 37/107* (2006.01)
*B64G 1/10* (2006.01)

(52) U.S. Cl.
CPC ............ *B64G 1/402* (2013.01); *F16L 37/107* (2013.01); *B64G 1/1078* (2013.01)

(58) Field of Classification Search
CPC ...... B64G 1/402; B64G 1/1078; B64G 1/646; B64G 4/00; F16L 37/107
See application file for complete search history.

(56) References Cited

U.S. PATENT DOCUMENTS 8,181,911 B1\* 5/2012 Gryniewski ......... B64G 1/1078
244/172.4
8,240,613 B2\* 8/2012 Ritter .................... B64G 1/646
244/172.4

(Continued)

FOREIGN PATENT DOCUMENTS

DE    10 2016 213 094 A1    1/2018

OTHER PUBLICATIONS

Jun. 23, 2020 Search Report issued in International Application No. PCT/G2020/050840.

(Continued)

*Primary Examiner* — Benjamin P Lee
(74) *Attorney, Agent, or Firm* — Nelson Mullins Riley & Scarborough LLP

(57) ABSTRACT

A first spacecraft comprises a drive mechanism. A second spacecraft comprises a valve for filling/draining the second spacecraft. The coupling assembly comprises a first connector comprising an actuating member configured to engage and open the valve and a coupling member configured to couple to the drive mechanism. A second connector comprises a stop portion and a bore for transferring fluid.

(Continued)

Operation of the drive mechanism rotates the coupling member and the second connector together to screw the second connector onto the valve until the stop portion engages the valve, the actuating member being prevented from moving relative to the second connector to open the valve whilst the lock is in the locked state. Once the stop portion engages the valve, operation of the drive mechanism to exert a torque on the coupling member greater than a predetermined torque level moves the lock to an unlocked state wherein the actuating member is moveable relative to the second connector to engage and open the valve.

15 Claims, 25 Drawing Sheets

(56) References Cited

U.S. PATENT DOCUMENTS

| | | |
|---|---|---|
| 9,231,323 B1* | 1/2016 | Jaeger .................. H01R 13/005 |
| 11,084,710 B1* | 8/2021 | Raven ...................... B67D 7/06 |
| 2007/0228220 A1 | 10/2007 | Behrens et al. |
| 2008/0237400 A1 | 10/2008 | Gryniewski et al. |
| 2012/0000575 A1 | 1/2012 | Yandle et al. |
| 2013/0153710 A1 | 6/2013 | Roberts et al. |

OTHER PUBLICATIONS

Jun. 23, 2020 Written Opinion issued in International Application No. PCT/GB/2020/050840.

* cited by examiner

COUPLING ASSEMBLY FOR FLUIDLY CONNECTING FIRST AND SECOND SPACECRAFT AND A KIT OF PARTS FOR A COUPLING AND A METHOD OF FLUIDLY CONNECTING FIRST AND SECOND SPACECRAFT USING A COUPLING

CROSS-REFERENCE TO RELATED APPLICATIONS

This application claims priority to and is a 35 U.S.C. § 371 U.S. National Stage Application of International Application No. PCT/GB2020/050840, entitled "A COUPLING ASSEMBLY FOR FLUIDLY CONNECTING FIRST AND SECOND SPACECRAFT AND A KIT OF PARTS FOR A COUPLING AND A METHOD OF FLUIDLY CONNECTING FIRST AND SECOND SPACECRAFT USING A COUPLING", filed Mar. 27, 2020, which claims priority to European Application No. 19275037.0, entitled "A COUPLING ASSEMBLY FOR FLUIDLY CONNECTING FIRST AND SECOND SPACECRAFT AND A KIT OF PARTS FOR A COUPLING AND A METHOD OF FLUIDLY CONNECTING FIRST AND SECOND SPACECRAFT USING A COUPLING", filed Mar. 29, 2019, the contents of each being incorporated by reference herein it is entirety.

FIELD

The present invention relates to a coupling assembly for fluidly connecting first and second spacecraft. The present invention also relates to a kit of parts for a coupling and to a method of fluidly connecting first and second spacecraft using a coupling.

BACKGROUND

It is sometimes necessary to transfer fluid to or from a spacecraft after the spacecraft has been launched into space. For example, it may be necessary to refuel a spacecraft by transferring propellant to the spacecraft or to drain fuel or other fluids from the spacecraft for re-use or disposal.

Some spacecraft have a valve that allows for filling and/or draining of the spacecraft. The valves typically comprise a part that is moved, for example, slid or rotated, to open the valve to allow for the transfer of fluid to or from the spacecraft. However, such valves are often designed for filling/draining the spacecraft prior to launch, and it can be difficult make a fluid connection with the valve and then perform the movement necessary to open the valve once in space. Situations should be avoided wherein the valve is opened before a proper fluid connection is made with the valve because this could result in fluid being released into space. In particular, the release of fluid, such as propellant, into space can create contamination risks to the spacecraft, may result in coating of instruments, and can alter the thermal properties of the external surfaces.

SUMMARY

It is an object of the present invention to provide an improved coupling assembly for fluidly connecting first and second spacecraft, a kit of parts for a coupling and a method of fluidly connecting first and second spacecraft using a coupling.

In accordance with some embodiments described herein, there is provided a coupling assembly for fluidly connecting first and second spacecraft, the first spacecraft comprising a drive mechanism and the second spacecraft comprising a valve for filling and/or draining the second spacecraft, the coupling assembly comprising: a first connector comprising an actuating member configured to engage and open the valve and a coupling member configured to couple to the drive mechanism such that the drive mechanism is operable to exert a torque on the coupling member to rotate the coupling member; a second connector comprising a stop portion and a bore for transferring fluid, the second connector configured to screw on to the valve until the stop portion engages the valve; and, at least one lock configured such that, in use, the or each lock is initially in a locked state wherein the coupling member is rotationally fixed relative to the second connector such that operation of the drive mechanism rotates the coupling member and the second connector together such that the second connector is screwed on to the valve until the stop portion engages the valve, the actuating member being prevented from moving relative to the second connector to engage and open the valve whilst the or each lock is in the locked state, and wherein the or each lock is configured such that, once the stop portion engages the valve, operation of the drive mechanism to exert a torque on the coupling member that is greater than a predetermined torque level moves the or each lock to an unlocked state wherein the actuating member is moveable relative to the second connector to engage and open the valve.

The coupling assembly therefore allows for the bore to be screwed on to the valve by applying a torque to the coupling member that is less than the predetermined torque level, thus helping to ensure that the valve is not accidentally opened before the coupling assembly is properly fluidly coupled to the valve, which could otherwise result in the leakage of fluid into space. Once the coupling assembly is attached to the valve, a torque can be applied to the coupling member that is greater than the predetermined torque level to move the or each lock to the unlocked state to open the valve.

In some embodiments, when the or each lock is moved to the unlocked state operation of the drive mechanism rotates the first connector relative to the second connector such that the actuating member moves axially towards the valve.

In some embodiments, the first connector is coupled to the second connector via an interface configured such that rotation of the first connector relative to the second connector causes axial movement of the first connector towards the valve such that the actuating member engages the valve. In some embodiments, the interface comprises a threaded connection.

In some embodiments, the or each lock comprises a frangible member. The frangible member may be configured such that when the stop portion engages the valve and above said predetermined torque level is exerted on the lock the frangible member breaks.

In some embodiments, the or each lock further comprises a biasing member configured to bias at least a portion of the frangible member radially. The biasing member helps to prevent said portion of the frangible member from becoming lodged in the coupling.

The biasing member may be configured to bias at least a portion of the frangible member radially outwardly.

In some embodiments, when the or each lock moves to the unlocked state the actuating member is moveable relative to the second connector to engage the valve such that operation of the drive mechanism to rotate the coupling member relative to the second connector opens the valve. In some embodiments, the valve comprises an opening portion that is moveable to open the valve, and wherein when the or each lock moves to the unlocked state the actuating member is moveable relative to the second connector to engage the opening portion such that operation of the drive mechanism to rotate the coupling member relative to the second connector urges the actuating member to move the opening portion to open the valve.

In some embodiments, the coupling assembly further comprises a biasing member configured to bias the actuating member axially towards the valve.

In some embodiments, when the or each lock is in the locked state the actuating member is axially fixed relative to the coupling member and when the or each lock is in the unlocked state the biasing member is configured to move the actuating member axially towards the valve. In some embodiments, the actuating member engages the valve when the or each lock is moved to the unlocked state and the actuating member moves axially under the force of the biasing member.

In some embodiments, when the lock or each is in the locked state a portion of the second connector engages the actuating member to restrict axial movement of the actuating member, and wherein when the or each lock is in the unlocked state the actuating member is rotatable relative to the second connector such that the actuating member moves out of engagement with said portion of the second connector and is moved axially towards the valve by the biasing member.

The valve may comprise an opening portion that is moveable to open/close the valve. In some embodiments, the actuating member is configured to engage the opening portion. In some embodiments, rotation of the coupling member relative to the second connector urges the actuating member to move the opening portion of the valve to open/close the valve.

The valve may comprise a valve body that is rotationally fixed relative to the second spacecraft. The opening portion may be moveable relative to the valve body to open/close the valve.

In some embodiments, the opening portion of the valve is rotatable to open the valve, and wherein the actuating member is configured to engage the opening portion such that the actuating member is rotationally fixed relative to the opening portion such that rotation of the first connector by the drive mechanism opens the valve.

In some embodiments, the actuating member comprises a sleeve configured to receive a part of the valve when the actuating member engages the valve and/or at least a portion of the actuating member is configured to be received within the valve to engage the valve.

In some embodiments, the opening portion of the valve is moveable axially to open the valve, and wherein the actuating member is configured to engage the opening portion and move the opening portion axially to open the valve.

In some embodiments, the first and second connectors are generally tubular. In some embodiments, the second connector is coaxially arranged with the first connector.

In some embodiments, the coupling member comprises a connecting portion for connection to a tool that is fluidly connected to the first spacecraft. The connecting portion may comprise, for example, a bayonet connection. In some embodiments, the drive mechanism is configured to drive the tool.

In some embodiments, the coupling member comprises an actuation portion that is configured to couple to the drive mechanism. The drive mechanism may comprise, for example, an actuating arm that is configured to interface with the actuation portion. In some embodiments, the actuating arm is configured to grip the actuation portion.

In some embodiments, the actuating member is rotationally fixed relative to the coupling member. Rotation of the coupling member may result in corresponding rotation of the actuating member.

In some embodiments, the coupling assembly further comprises a fastener configured to retain the coupling member coupled to the drive mechanism. In some embodiments, the fastener is magnetic.

In some embodiments, the coupling assembly further comprises a clutch mechanism configured such that above a second predetermined torque level must be exerted on the coupling member by the drive mechanism to rotate the coupling member relative to the second connector. The clutch mechanism may therefore help to prevent the valve from being accidentally opened once the actuating member engages the valve because above the second predetermined toque level must be exerted on the coupling member to open/close the valve.

The second predetermined torque level may be less than the predetermined torque level to move the or each lock to the unlocked state.

In some embodiments, the clutch mechanism comprises a clutch member that is slidably arranged with one of the first and second connectors and engages the other one of the first and second connectors to resist rotation between the coupling member and the second connector.

In some embodiments, wherein the clutch mechanism comprises a biasing member that is configured to urge the clutch member against said other one of the first and second connectors.

In some embodiments, the clutch mechanism is configured such that rotation of the clutch member relative to said other one of the first and second connectors urges the clutch member axially against the force of the biasing member of the clutch mechanism.

The clutch mechanism may permit rotation of the coupling member relative to the second connector when the stop portion engages the valve and the drive mechanism is operated to exert a torque on the coupling member that is greater than the predetermined torque level and second predetermined torque level to allow the or each lock to move to the unlocked state. The clutch mechanism may then resist rotation of the coupling member relative to the second connector when the drive mechanism is operated at below the second predetermined torque level during connection of a tool to the coupling member. The clutch mechanism may then permit rotation of the coupling member relative to the second connector when the drive mechanism is operated to exert a torque on the coupling member that is above the second predetermined torque level in order to open the valve.

In accordance with some embodiments described herein, there is provided a first spacecraft and the coupling assembly described herein.

In accordance with some embodiments described herein, there is provided a kit of parts for a coupling for fluidly connecting first and second spacecraft, the first spacecraft comprising a drive mechanism and the second spacecraft comprising a valve for filling and/or draining the second spacecraft, the kit of parts comprising: a set of two or more actuating members configured to engage and open different types of valve; a coupling member configured to couple to the drive mechanism such that the drive mechanism is operable to rotate the coupling member, each actuating member configured to be attached to the coupling member such that the actuating member and coupling member form a first connector; a second connector comprising a stop portion and a bore for transferring fluid, the second connector configured to screw on to the valve until the stop portion engages the valve; and, at least one lock configured such that, when the coupling is assembled and is in use, the or each lock is initially in a locked state wherein the coupling member is rotationally fixed relative to the second connector such that operation of the drive mechanism rotates the coupling member and the second connector together such that the second connector is screwed on to the valve until the stop portion engages the valve, the actuating member being prevented from moving relative to the second connector to engage and open the valve whilst the or each lock is in the locked state, and wherein once the stop portion engages the valve operation of the drive mechanism to exert a torque on the coupling member that is greater than a predetermined torque level moves the or each lock to an unlocked state wherein the actuating member is moveable relative to the second connector to engage and open the.

In some embodiments, the kit of parts is configured such that the coupling has any of the features of the coupling assembly described herein.

In accordance with some embodiments described herein, there is provided a method of fluidly connecting first and second spacecraft using a coupling, the first spacecraft comprising a drive mechanism and the second spacecraft comprising a valve for filling and/or draining the second spacecraft, the coupling comprising: a first connector comprising an actuating member configured to engage and open the valve and a coupling member configured to couple to the drive mechanism such that the drive mechanism is operable to exert a torque on the coupling member to rotate the coupling member; a second connector comprising a stop portion and a bore for transferring fluid, the second connector configured to screw on to the valve until the stop portion engages the valve; and, at least one lock configured such that, in use, the or each lock is initially in a locked state wherein the coupling member is rotationally fixed relative to the second connector, the actuating member being prevented from moving relative to the second connector to engage and open the valve, the method comprising: connecting the second connector to the valve by operating the drive mechanism with the or each lock in the locked state to rotate the coupling member and the second connector together such that the second connector is screwed on to the valve until the stop portion engages the valve; and then, moving the or each lock to the unlocked state by operating the drive mechanism to exert a torque on the coupling member that is greater than a predetermined torque level such that the actuating member is moveable relative to the second connector to engage the valve.

In some embodiments, the step of connecting the second connector to the valve comprises operating the drive mechanism to exert a torque on the coupling member that is less than the predetermined torque level.

In some embodiments, the coupling comprises a clutch mechanism configured such that above a second predetermined torque level must be exerted on the coupling member by the drive mechanism to rotate the coupling member relative to the second connector, the method comprising: once the or each lock has been moved to the unlocked state, fluidly connecting a tool to the coupling member by exerting a torque on the tool that is less than the second predetermined torque level until the tool is coupled to the coupling member; and then, exerting a torque on the tool that is greater than the second predetermined torque level to rotate the coupling member relative to the second connector to open the valve.

BRIEF DESCRIPTION OF THE FIGURES

Embodiments will now be described, by way of example only, with reference to the accompanying drawings, in which.

DETAILED DESCRIPTION

Referring now to FIGS. 1 to 20, a first embodiment of a coupling 10 for fluidly connecting first and second spacecraft S1, S2 is shown.

Figure 20:
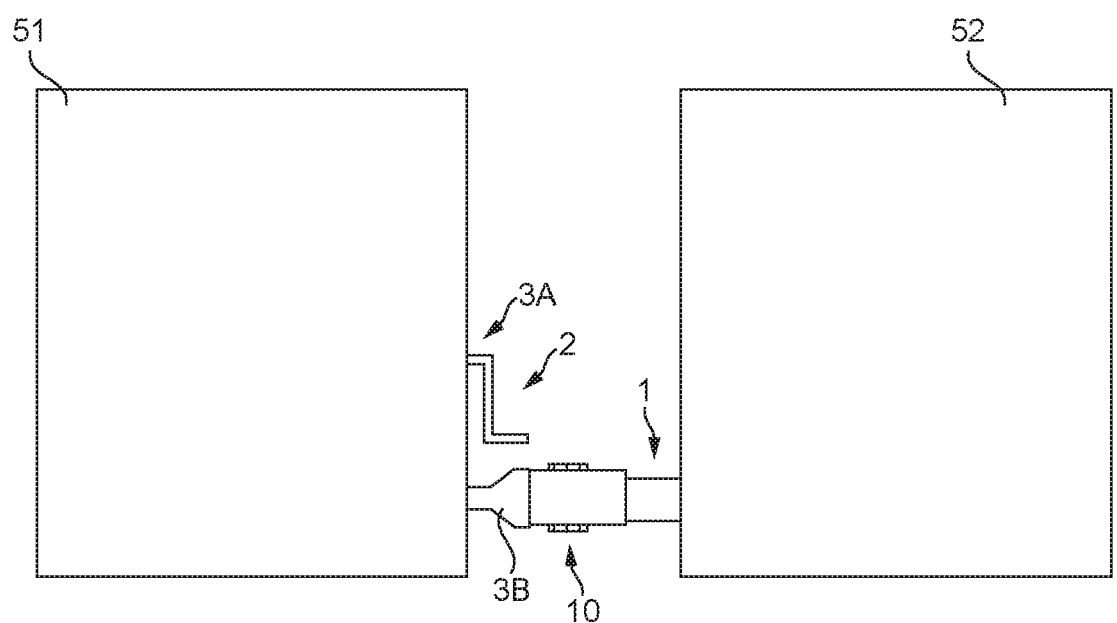
FIG. 20 is a schematic side view of first and second spacecraft fluidly connected by the coupling of FIG. 1.
Figure 21:
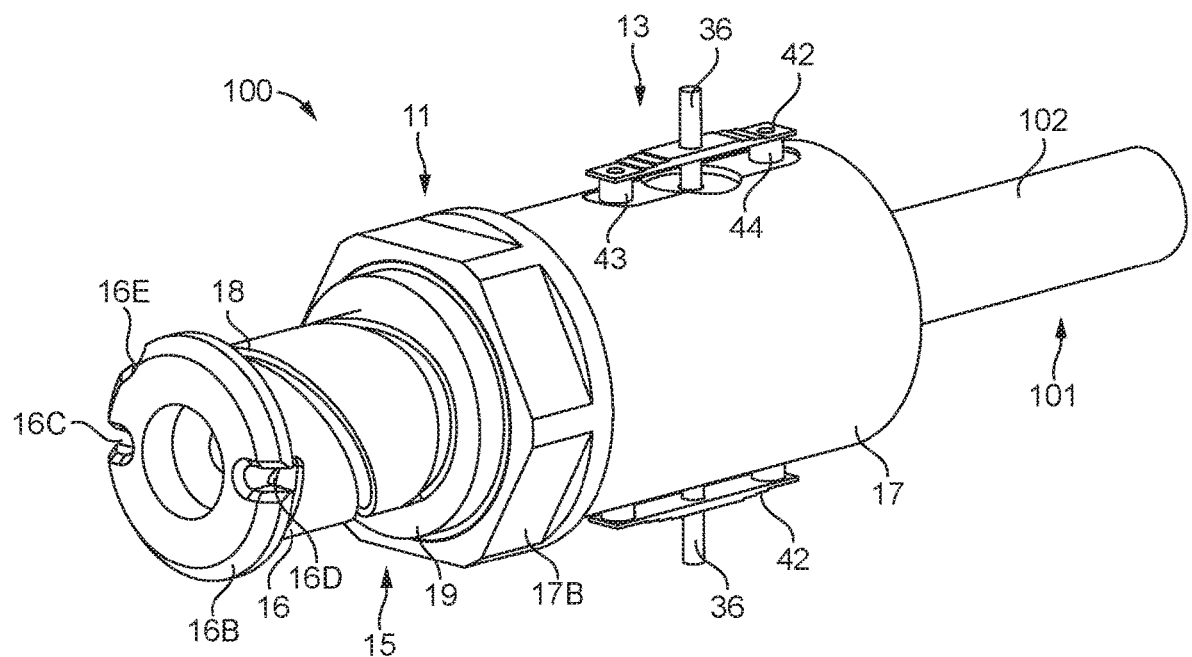
FIG. 21 is a first perspective view of a coupling according to a second embodiment.
Figure 22:
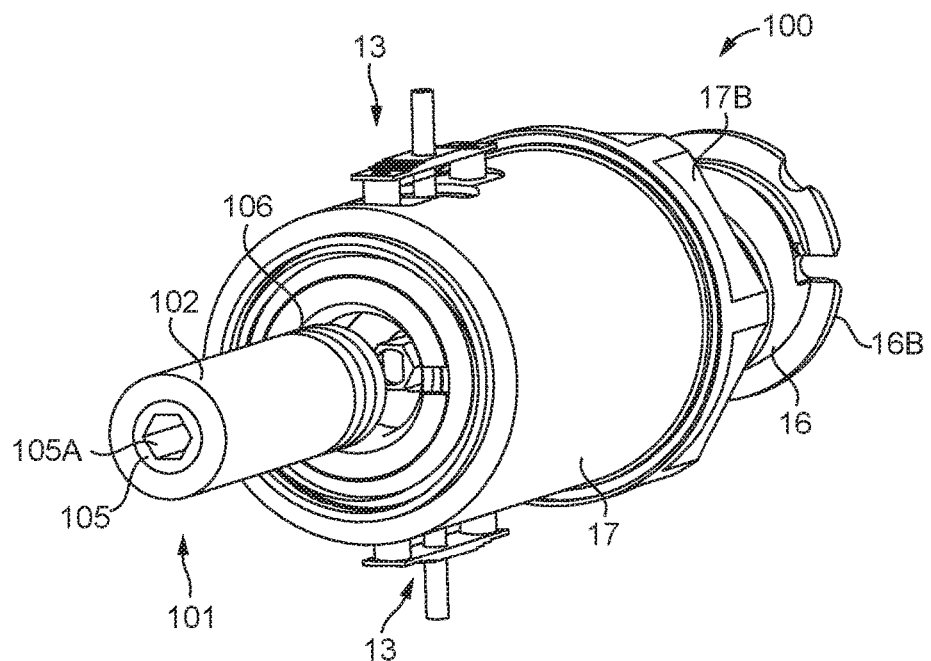
FIG. 22 is a second perspective view of the coupling of FIG. 21.
Figure 23:
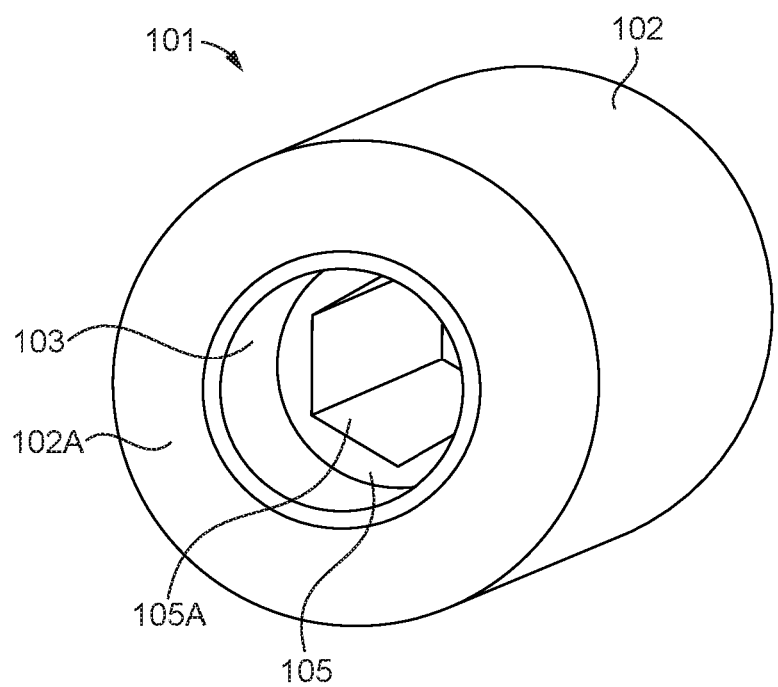
FIG. 23 is a perspective view of a valve of a second spacecraft, the coupling of FIG. 21 configured to couple to and open the valve.
Figure 24:
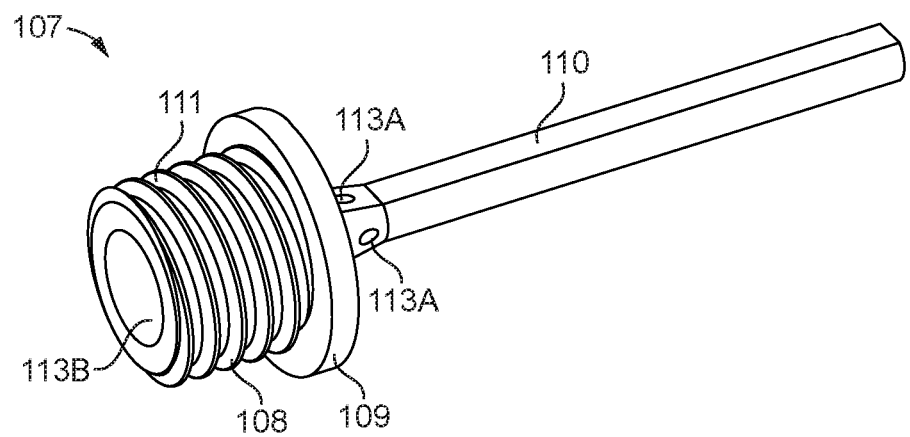
FIG. 24 is a first perspective view of an extension member of the coupling of FIG. 21.
Figure 25:
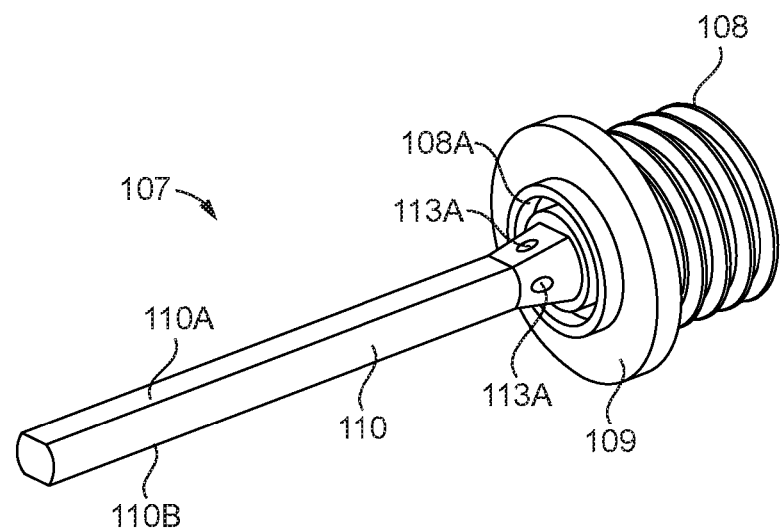
FIG. 25 is a second perspective view of the extension member of the coupling of FIG. 21.
Figure 26:
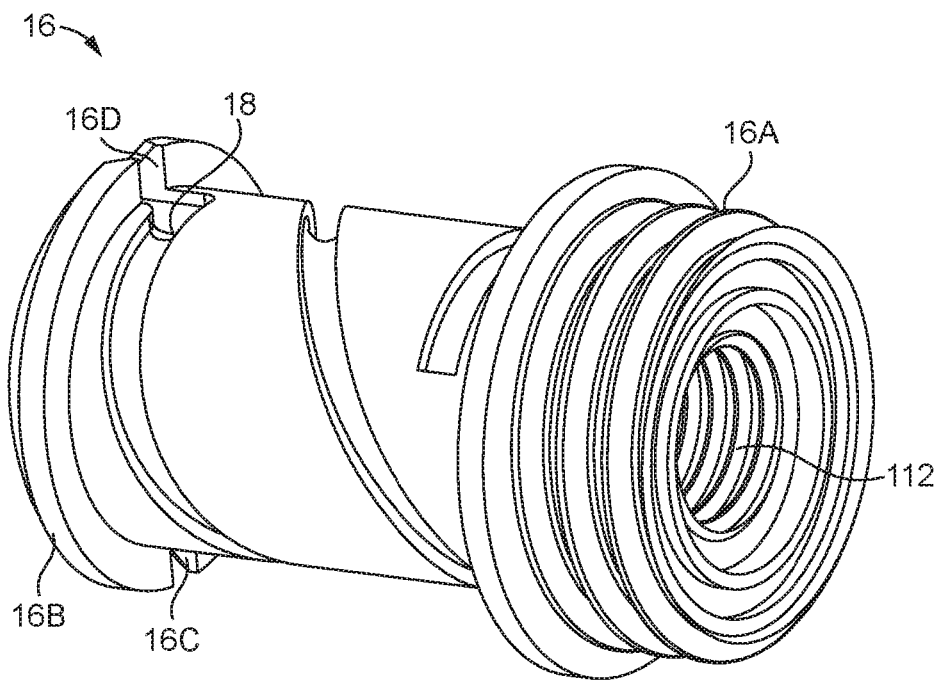
FIG. 26 is a perspective view of a first tubular member of the coupling of FIG. 21.
Figure 27:
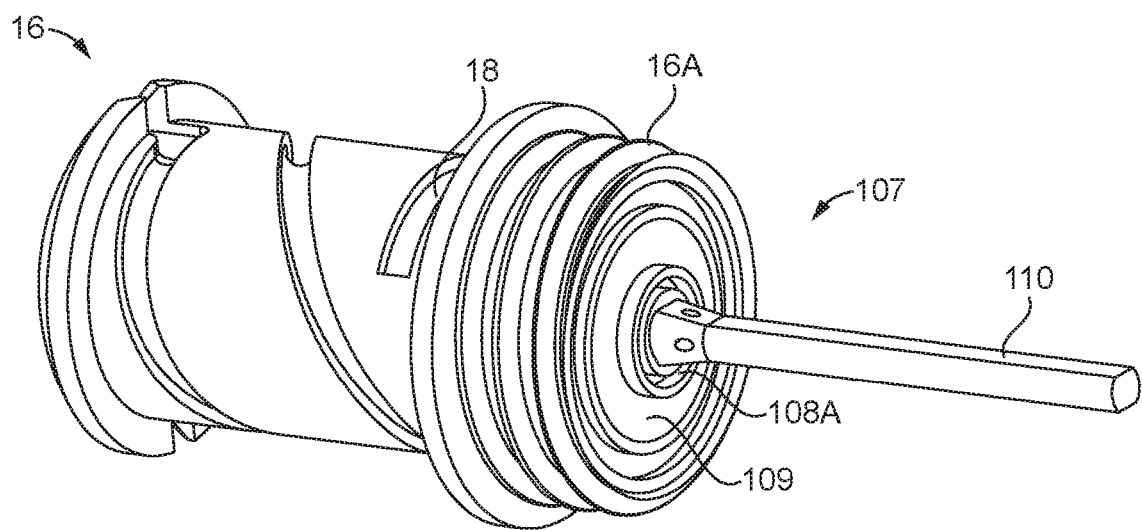
FIG. 27 is a perspective view of the first tubular member and extension member of the coupling of FIG. 21.
Figure 28:
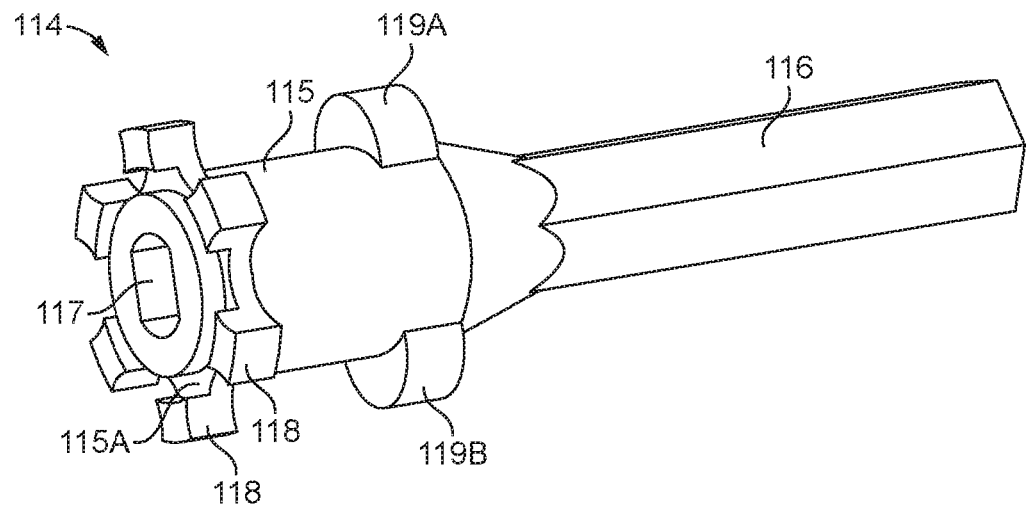
FIG. 28 is a first perspective view of an actuating member of the coupling of FIG. 21.
Figure 29:
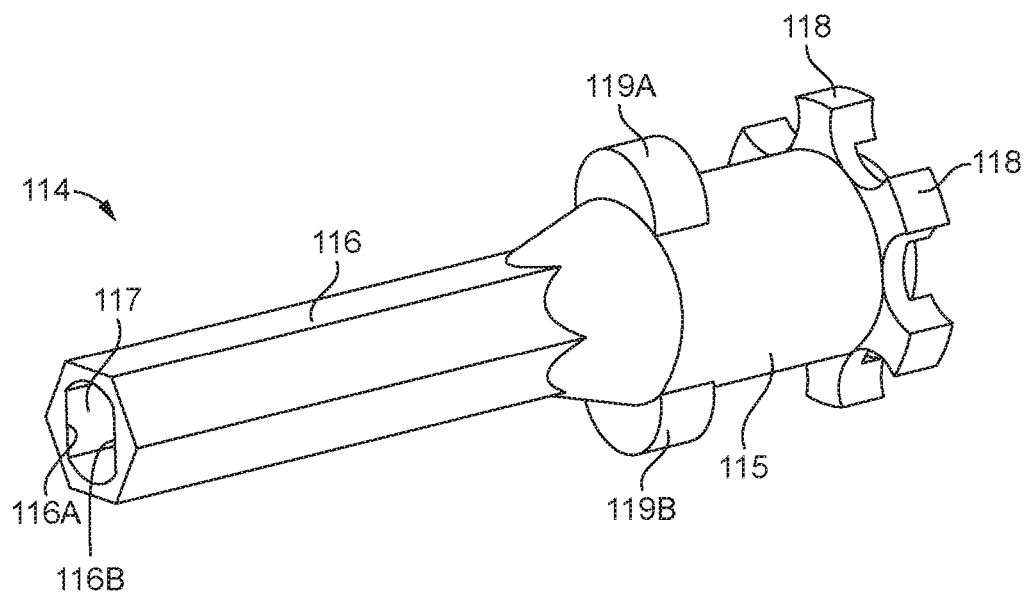
FIG. 29 is a second perspective view of the actuating member of the coupling of FIG. 21.
Figure 30:
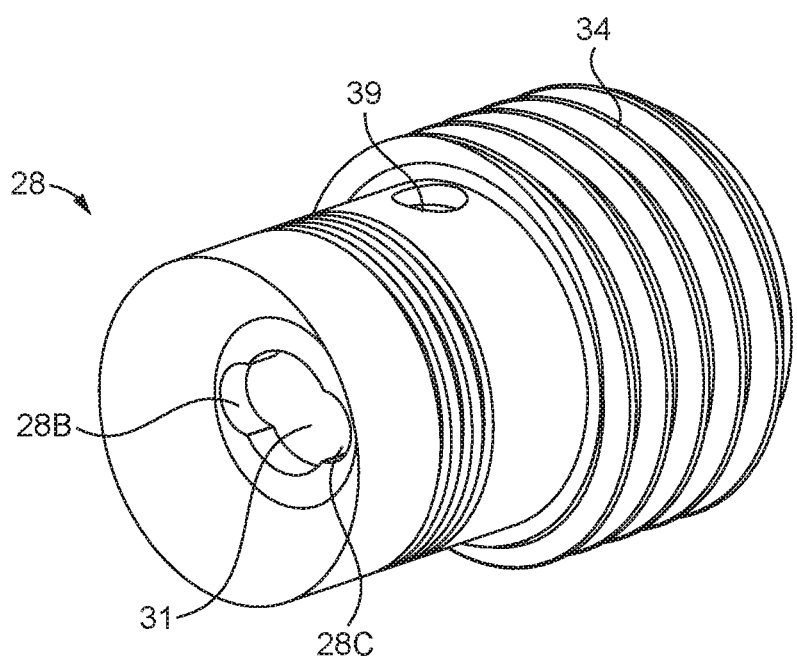
FIG. 30 is a perspective view of an outer tubular member of the coupling of FIG. 21.
Figure 31:
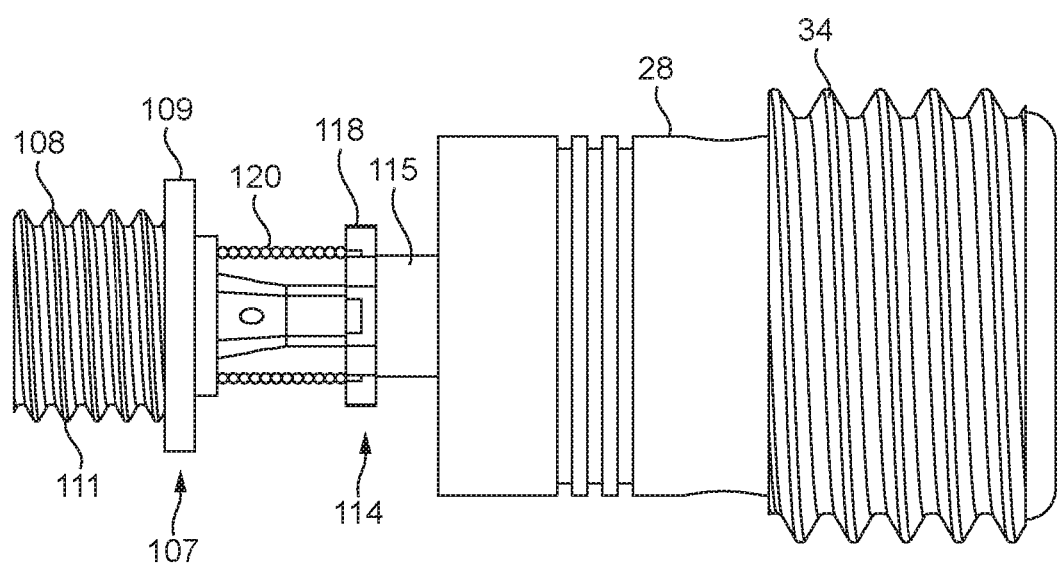
FIG. 31 is a side view of the extension member, actuating member, biasing member, and outer tubular member of the coupling of FIG. 21.
Figure 32:
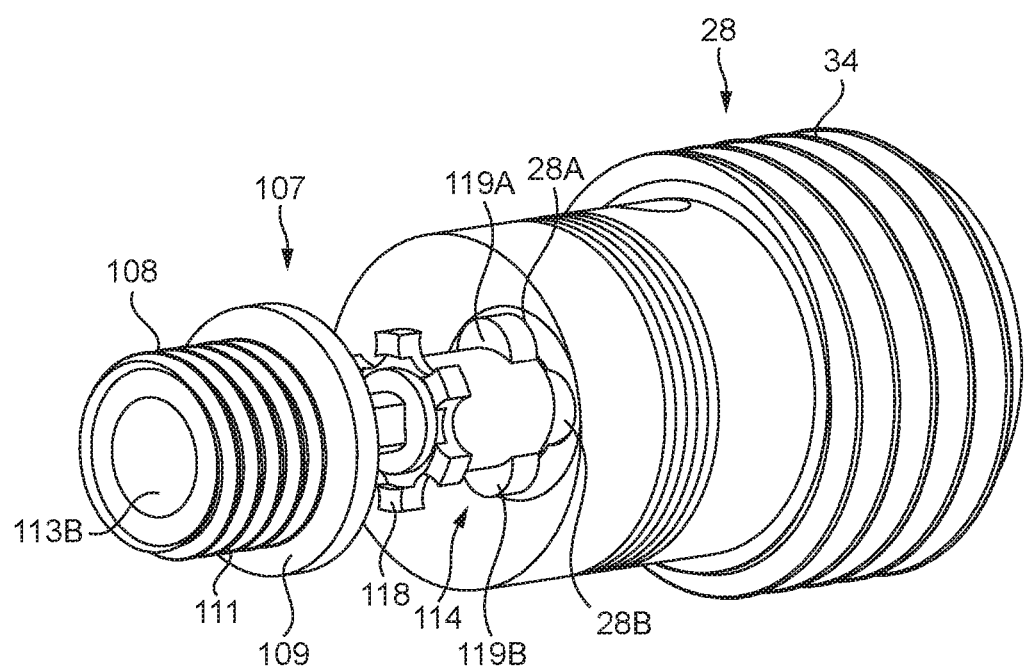
FIG. 32 is a perspective view of the extension member, actuating member and outer tubular member of the coupling of FIG. 21.

The first spacecraft S1 comprises a drive mechanism 2 that comprises an actuating arm 3A configured to couple to the coupling 10 for rotating the coupling 10 and a tool 3B configured to couple to the coupling 10 for fluidly connecting to the coupling 10 and rotating the coupling 10 (as shown in FIG. 20).

The actuating arm 3A is configured to be rotationally fixed relative to the coupling 10 such that rotation of the actuating arm 3A causes rotation of the coupling 10. In some embodiments, the actuating arm 3A is configured to grip a portion of the coupling 10, for instance, an actuation portion 17B of the coupling 10 as described below. The actuating arm 3A may comprise, for example, a wrench or spanner that grips the coupling 10 or may comprise a socket that receives a portion of the coupling 10 to couple to the coupling 10.

The tool 3B comprises a generally cylindrical peripheral wall 4 that defines a space 4A therein. The tool 3B further comprises first and second engaging elements 5A, 5B and an alignment element 5C. The first and second engaging elements 5A, 5B and the alignment element 5C are in the form of first, second and third projections 5A, 5B, 5C respectively that extend radially inwardly from an inner surface of the wall 4. The first and second engaging elements 5A, 5B are provided on opposite sides of the inner surface of the wall 4 such that the elements 5A, 5B extend radially inwardly towards each other.

The drive mechanism 2 comprises a first drive (not shown) which is operable to rotate the actuating arm 3A and a second drive (not shown) which is operable to rotate the tool 3B. The first and second drives may each comprise, for example, an electric motor or may be actuated hydraulically or by compressed gas. In some embodiments, the first and second drives are coupled to the actuating arm 3A and tool 3B respectively via one or separate gearboxes (not shown). In one embodiment (not shown), a single drive rotates both the actuating arm 3A and tool 3B.

In some embodiments, the actuating arm 3A and first drive are provided separate to the tool 3B and second drive on the first spacecraft S1. In some embodiments, the actuating arm 3A and tool 3B may be located such that the first or second spacecraft S1, S2 must be manoeuvred to engage each of the actuating arm 3A and tool 3B with the coupling 10. In another embodiment, the actuating arm 3A may have sufficient reach, or itself may be manoeuvrable, such that both the actuating arm 3A and tool 3B may engage the coupling 10 without changing the position of the first or second spacecraft S1, S2.

The second spacecraft S2 comprises a valve 1 that is fluidly connected to a tank (not shown) of the second spacecraft S2. The valve 1 is configured to allow for the transfer of fluid to or from the tank of the second spacecraft S2. In the present embodiment, the tank is a fuel tank and the valve 1 is configured to allow for refuelling and drainage of the fuel tank.

The valve 1 comprises a generally cylindrical valve body 6 with an opening portion 7 that is configured to be engaged by the coupling 10. The valve body 6 is fixed relative to the second spacecraft S2. The opening portion 7 is rotatable relative to the valve body 6 to open/close the valve 1.

The valve body 6 has an external thread 8 on a peripheral surface of the valve body 6 (shown in FIG. 18), proximate to an end 6A of the valve body 6. A bore 9 extends through the valve body 6 to selectively permit the transfer of fluid to or from the tank of the second spacecraft S2.

In the present embodiment, the valve 1 is of a type wherein the opening portion 7 is rotated in a first rotational direction to open the valve 1 and is rotatable in an opposite second rotational direction, opposite to the first rotational direction, to close the valve 1. Such valves will be known to the skilled person. Examples of such valves include those manufactured by VACCO™ and Cobham PLC™.

Examples of VACCO™ valves are the VACCO™ High Pressure Fill & Drain Valves, including the ¼ inch High Pressure Gas Fill & Drain Valves (part no. V1E10430-01 or V1E10811-01), or the ⅛ inch Miniature Fill & Drain Valve (part no. V1E108-(5-01). Other examples of VACCO™ valves are the Low Pressure Fill & Drain Valves, including the ½ inch Low Pressure Fill & Drain Valve (part no. V1E10401-01), the ¼ inch Low Pressure Fill & Drain Valve (part no. V1E10400-01), and the ¼ inch Low Pressure Fill & Drain Valve (part no. V1E10433-01). Other examples are Cobham PLC™ ¼ inch, ⅜ inch and ½ inch service valves and miniature service valve (part no. 1838-015). However, it should be recognised that the aforementioned list is not limiting and the coupling 10 may be configured for use with other types of valves by the same or other manufacturers.

The coupling 10 comprises a first connector 11, a second connector 12 and a pair of locks 13.

The first connector 11 comprises an actuating member 14 and a coupling member 15. The coupling member 15 is configured to couple to the tool 3B of the drive mechanism 2 of the first spacecraft S1 such that the second drive of the drive mechanism 2 is operable to rotate the coupling member 15. This causes rotation of the actuating member 14, which is rotationally fixed relative to the coupling member 15 and slideably coupled thereto.

The coupling member 15 comprises first and second tubular members 16, 17 that are screwed together via respective threads 16A, 17A during assembly of the coupling 10. A passage 20 extends through the coupling member 15 to allow the transfer of fluid therethrough, the passage 20 being formed in the first and second tubular members 16, 17. In some embodiments, the first and second tubular members 16, 17 are fixed together, for example, by a weld or adhesive. In another embodiment (not shown), the first and second tubular members 16, 17 are instead integrally formed, and coupling member 15 may be formed from a single piece of material.

The first tubular member 16 is configured to engage with the tool 3B of the drive mechanism 2. The first tubular member 16 comprises a pair of grooves 18 that are configured to each receive one of the first and second engaging members 5A, 5B of the tool 3B. The grooves 18 are arranged such that rotation of the tool 3B relative to the first tubular member 16 causes the first and second engaging elements 5A, 5B to move along the grooves 18 such that the tool 3B and first tubular member 16 move relative to each other such that the tool 3B is drawn axially on to the first tubular member 16. This relative movement occurs until the tool 3B forms a sealed connection over the first tubular member 16. The grooves 18 may follow a generally helical path about the central axis of the first connector 11.

In some embodiments, one or both of the tool 3B and coupling 10 comprises a valve (not shown) that is configured to be closed when the tool 3B is disconnected from the coupling 10 and is configured to open when the tool 3B is fluidly connected to the coupling 10. The valve(s) therefore prevents accidental leakage of fluid to or from the coupling 10 and/or prevents accidental leakage of fluid to or from the tool B.

In some embodiments, the first and second engaging elements 5A, 5B and grooves 18 together form a bayonet connection. It should be recognised that in alternative embodiments (not shown) to those described above, one of the engaging elements 5A, 5B and corresponding grooves 18 may be omitted, or additional elements and corresponding grooves may be provided. It should also be recognised that a different type of connection between the coupling member 15 and tool 3B is possible, for example, a threaded connection.

The first tubular member 16 comprises a flanged end 16B with first, second and third slots 16C, 16D, 16E for respectively receiving the first and second engaging elements 5A, 5B and the alignment element 5C. The pair of grooves 18 extend from the first and second slots 16C, 16D respectively. The first and second engaging elements 5A, 5B pass through the first and second slots 16C, 16D when the tool 3B is coupled to the first tubular member 16 such that the first and second engaging elements 5A, 5B enter the respective grooves 18.

The alignment element 5C passes through the third slot 16E when the tool 3B is coupled to the tubular member 16. The alignment element 5C is located closer to one of the first and second engaging elements 5A, 5B than the other, and the third slot 16E is similarly located closer to one of the first and second slots 16C, 16D than the other. Therefore, tool 3B must have a particular rotational alignment relative to the first tubular member 16 to connect therewith. The alignment element 5C and corresponding slot 16E therefore help to ensure a consistent rotational alignment of the tool 3B and first connector 11.

In some embodiments, the first connector 11 comprises a fastener 19 that abuts the tool 3B when the tool 3B is coupled to the first tubular member 16. The fastener 19 is configured to couple to the tool 3B prevent accidental detachment of the tool 3B from the first tubular member 16. In the present embodiment, the fastener 19 is in the form of a ring-shaped magnetic member 19 that magnetically attaches to the tool 3B.

The second tubular member 17 comprises an actuation portion 17B that is configured to be engaged by the drive mechanism 2 such that the drive mechanism 2 is able to exert a torque on the second tubular member 17 to rotate the second tubular member 17.

The second tubular member 17 comprises a space 21 for receiving the second connector 12. The second tubular member 17 further comprises a reaction portion 22 that projects radially outwardly from an exterior surface of the second tubular member 17. The reaction portion 22 extends circumferentially about the central axis of the first connector 11 and has a recess 22A. However, it should be recognised that in another embodiment (not shown) the reaction portion 22 may comprise one or more protuberances that extend radially outwardly. The reaction portion 22 provides a reaction surface for a biasing member 23 that is configured to bias the actuating member 14, as explained below.

The actuating member 14 comprises a tubular sleeve 24 that is generally cylindrical. A first end 25 of the tubular sleeve 24 faces towards the reaction portion 22 and comprises a recess 25A.

The biasing member 23 is located between the reaction portion 22 and the first end 25 of the tubular sleeve 24. The biasing member 23 is received in the recess 22A of the reaction portion 22 and the recess 25A of the tubular sleeve 25. The biasing member 23 extends about the circumference of the cylindrical wall of the second tubular member 17. The biasing member 23 urges the actuating member 14 axially away from the reaction portion 22 of the coupling member 15. In some embodiments, the biasing member 23 comprises a spring, for instance, a helical spring. In other embodiments (not shown), the biasing member 23 has a different configuration, for example, comprising a portion of resiliently deformable material.

A second end 26 of the sleeve 24 is configured to engage with the opening portion 7 of the valve 1 such that the opening portion 7 is at least partially received in the second end 26 and the sleeve 24 is thus rotationally fixed relative to the opening portion 7. Thus, rotation of the sleeve 24 results in corresponding rotation of the opening portion 7 to open/close the valve 1.

In some embodiments, the opening portion 7 of the valve 1 has a non-circular cross-section and the second end 26 of the sleeve 24 has a space 26A that corresponds to the shape of the opening portion 7. In the present embodiment, the cross-sectional outline of the opening portion 7 is hexagonal and the space 26A also has a hexagonal cross-section to receive the opening portion 7 and couple thereto. However, it should be recognised that the opening portion 7 of the valve 1 and the space 26A in the second end 26 of the sleeve 24 may have a different shape, for example, oval, triangular, square, rectangular, or octagonal. The shape of the space 26A does not need to be the same as the shape of the opening portion 7 of the valve 1, providing the space 26A is shaped to allow for the second end 26 to rotate the opening portion 7. In some embodiments (not shown), the opening portion 7 is circular and has an engaging feature, for example, a protrusion/groove, that engages with a corresponding engaging feature of the actuating member 14, for example, a groove/protrusion.

The second connector 12 comprises inner and outer tubular members 27, 28 that are coaxially arranged. The inner tubular member 27 is generally cylindrical and comprises a threaded bore 29 configured to engage with the thread 8 on the valve body 6. The inner tubular member 27 further comprises an external thread 30 on a peripheral surface of the inner tubular member 27.

The outer tubular member 28 is generally cylindrical and comprises a passage 31 for the transfer of fluid and having an internal thread 32. The inner tubular member 27 is at least partially received within the outer tubular member 28 such that the passage 31 is fluidly communicated with the threaded bore 29.

The inner and outer tubular members 27, 28 are screwed together via the threads 30, 32 during assembly of the coupling 10. In some embodiments, the inner and outer tubular members 27, 28 are fixed relative to each other by, for example, a weld or adhesive. In another embodiment (not shown), the inner and outer tubular members 27, 28 are instead integrally formed. The second connector 12 may be formed from a single piece of material.

The coupling 10 comprises an interface 33 between the first and second connectors 11, 12. In the present embodiment, the interface 33 is between the coupling member 15 of the first connector 11 and the outer tubular member 28 of the second connector 12. The interface 33 comprises an external thread 34 on a peripheral surface of the inner tubular member 27 and an internal thread 35 on an inner surface of the second tubular member 17 of the coupling member 15. The threads 34, 35 are configured to engage such that when the coupling member 15 is rotated relative to the second connector 12, the coupling member 15 is urged axially relative to the second connector 12.

The locks 13 are located on opposite sides of the connector 10. Each lock 13 comprises a frangible member 36, which in the present embodiment is in the form of a breakable locking pin 36. The locking pin 36 of each lock 13 has a first end 37 that is received in a respective recess 39 in the outer tubular member 28. The first end 37 is secured in the respective recess 39, for example, by adhesive, cooperating screw threads, or a compression fit.

Each locking pin 36 extends radially outwardly from the first end 37 through a respective aperture 40 in the second tubular member 17 of the coupling member 15 and through a respective aperture 41 in the actuating member 14 such that a second end 38 of each locking pin 36 protrudes radially from a peripheral surface of the actuating member 14.

Each lock 13 further comprises a biasing member 42, which in the present embodiment is in the form of a leaf spring 42, which is attached to the second end 38 of the respective frangible member 36. Each leaf spring 42 is attached to the second tubular member 17 of the coupling member 15 via respective first and second legs 43, 44. The first and second legs 43, 44 extend radially outwardly from the second tubular member 17 and extend through respective first and second slots 45, 46 in the sleeve 24 of the actuating member 14.

Each of the first and second slots 45, 46 extends in the direction of the central axis (depicted by chain-dashed line A-A shown in FIG. 19) of the coupling 10 such that the first and second legs 43, 44 are able to slide in the axial direction A-A within the first and second slots 45, 46. Thus, the actuating member 14 is able to slide axially relative to the coupling member 15 from a retracted positon to an extended position, in a first axial direction (shown by arrow 'X' shown in FIG. 19).

The biasing member 23 urges the actuating member 14 in the first axial direction X such that the biasing member 23 is biased from the retracted position into the extended position. This is because the biasing member 23 is compressed between the reaction portion 22 of the first tubular member 16 and the first end 25 of the actuating member 14 when the actuating member 14 is in the retracted position.

Each lock 13 is initially in a locked state wherein the lock 13 holds the actuating member 14 in the retracted positon relative to the coupling member 15, against the force of the biasing member 23. This is because the first end 37 of each locking pin 36 is received in the respective recess 39 in the outer tubular member 28 of the second connector 12, each locking pin 36 extends through the aperture 40 in the connecting member 15, and the second end 38 of each locking pin 36 extends through the respective aperture 41 in the actuating member 14. Therefore, the locking pins 36 fix the second connector 12, actuating member 14 and coupling member 15 relative to each other. Therefore, the actuating member 14 is prevented from moving axially relative to the coupling member 15 under the biasing force of the biasing member 23.

Each locking pin 36 has a weakened portion 47 configured such that the locking pins 36 break at the weakened portion 47 when greater than a predetermined force is applied to the weakened portion 47. Therefore, the locks 13 are opened when a predetermined release torque is exerted on the first connector 11 relative to the second connector 12, said release torque being the torque required to break all of the locking pins 36.

In the present embodiment, each weakened portion 47 comprises a narrowed neck portion 47. However, in alternative embodiments (not shown), the weakened portion may comprise, for example, a portion having an aperture/recess therein or a portion that is manufactured from a weaker material.

The neck portion 47 of each locking pin 36 is located between the second tubular member 17 of the coupling member 15 and the outer tubular member 28 of the second connector 12. Therefore, the locking pins 36 will break at the neck portion 47 if sufficient force is exerted on the coupling member 15 to rotate the coupling member 15 relative to the second connector 12.

Each leaf spring 42 is configured to urge the locking pin 36 radially outwardly. When a force is exerted on the coupling member 15 to rotate the coupling member 15 relative to the second connector 12 and break the locking pins 36 at the neck portion 47, the first end 37 of each locking pin 36 remains in the respective recess 39 and the remainder of the locking pin 36 is moved radially outwardly under the force of the respective leaf spring 42 such that the locking pin 36 is no longer received within the aperture 40 in the second tubular member 17 of the coupling member 15 and thus each lock 13 is moved to an unlocked state. Therefore, the actuating member 14 is able to slide relative to the coupling member 15 in the first axial direction X under the force of the biasing member 23. Moreover, the actuating member 14 and coupling member 15 of the first connector 11 are able to rotate relative to the second connector 12 when a torque is exerted on the first connector 11 by the drive mechanism 2, as will be explained in more detail below. The leaf spring 42 helps to prevent the locking pin 36 interfering with the threads 34, 35 of the interface 33 once the locking pin 36 has been broken. The second end 38 of each locking pin 36 remains attached to respective leaf spring 42 once broken, which prevents the locking pin 36 from being discarded into space.

It should be recognised that in alternative embodiments (not shown) one of the locks 13 may be omitted, or alternatively the coupling 10 may comprise three or more locks 13. It should also be recognised that the or each lock 13 may have a different arrangement to that described above. For instance, the leaf spring 42 may be replaced with a different biasing member (not shown), for example, a coil spring, elastic or resilient material. In another embodiment (not shown), each locking pin 36 is hollow and contains a biasing member that urges the locking pin 36 outwardly upon breaking of the locking pin 36 at the weakened portion 47. In yet another embodiment, the biasing member of each lock is omitted entirely.

The coupling 10 further comprises a clutch mechanism 48 that is configured such that above a predetermined torque level must be exerted on the first connector 11 by the drive mechanism 2 to open/close the valve 1. The clutch mechanism 48 therefore prevents the valve 1 accidentally being opened/closed if a small external torque less than the predetermined torque level is applied to the first connector 11 after the coupling 10 has been attached to the valve 1, for example, due to vibrations or an accidental impact with the coupling 10.

The clutch mechanism 48 is configured to prevent the first connector 11 rotating relative to the second connector 12 unless a torque above the predetermined torque level is applied to the first connector 11. Therefore, when the actuating member 14 of the first connector 11 is engaged with the opening portion 7 of the valve 1 and the inner tubular member 27 of the second connector 12 is screwed on to the valve body 6, relative rotation of the opening portion 7 relative to the valve body 6 is prevented by the clutch mechanism 48 unless a torque above the predetermined torque level is applied to the first connector 11.

The driving mechanism 2 may be configured to rotate the tool 3B at a torque less than the predetermined torque level during connection of the tool 3B to the connector 10.

The clutch mechanism 48 therefore prevents accidental opening/closing of the valve 1 before the coupling 10 is fluidly connected to the valve 1, which could otherwise result in the leakage of fluid into space.

The clutch mechanism 48 couples the first connector 11 to the second connector 12. The clutch mechanism 48 may be in the form of an overload clutch, although the skilled person will recognise that other configurations are possible. The clutch mechanism 48 may have the configuration of a torque limiter.

In the present embodiment, the clutch mechanism 48 comprises a clutch member 49, which may be a clutch plate 49 although other configurations are possible. The clutch plate 49 is disposed within the second tubular member 17 of the coupling member 15. The clutch plate 49 comprises an aperture 50 to allow for fluid to flow through the clutch plate 49.

The clutch plate 49 may be generally circular in cross-section. The clutch plate 49 is configured to slide axially relative to the coupling member 15 but to be rotationally fixed relative to the coupling member 15. Thus, the clutch plate 49 cannot rotate relative to the coupling member 15.

The clutch plate 49 comprises one or more engaging features that are configured to engage with corresponding engaging features of the coupling member 15 to rotationally fix the clutch plate 49 and coupling member 15 whilst permitting axial movement therebetween. In the present embodiment, the clutch plate 49 comprises one or more feet 51 that extend radially outwardly from the clutch plate 49. Each foot 51 is configured to be located in a respective track 52 in an inner surface of the second tubular member 17 of the coupling member 15. In the present embodiment, the clutch plate 49 comprises three feet 51 that are each received in a respective track 52.

In other embodiments (not shown), the clutch plate 49 and coupling member 15 comprise other types of engaging features, for example, grooves, ridges or tags that cooperate. In one embodiment (not shown), the coupling member 15 comprises one or more ridges that project inwardly from the inner surface thereon and are engaged in one or more respective grooves in the clutch plate 49.

The first tubular member 16 of the coupling member 15 comprises an annular groove 53 that faces towards the clutch plate 49. The clutch plate 49 comprises an annular groove 54 that faces towards the first tubular member 16.

The clutch mechanism 48 further comprises a biasing member 55 located between the first tubular member 16 and the clutch plate 49. A first end of the biasing member 55 is located in the groove 53 of the first tubular member 16 and a second end of the biasing member 55 is located in the groove 54 of the clutch plate 49.

The biasing member 55 may be, for example, a spring such as a helical spring or a portion of resilient material. The biasing member 55 is configured to urge the clutch plate 49 in the first axial direction X relative to the coupling member 15 such that the biasing force of the biasing member 55 biases the clutch plate 49 against the outer tubular member 28 of the second connector 12. Thus, a portion of the clutch plate 49 abuts a portion of the outer tubular member 28.

The clutch plate 49 and outer tubular member 28 are configured such that, when said portions abut, relative rotation between the clutch plate 49 and the outer tubular member 28 of the second connector 12 is resisted. Therefore, relative rotation between the second connector 12 and the first connector 11, which is rotationally fixed relative to the clutch plate 49 via the feet 51 received in the tracks 52, is also resisted. This means that when the first connector 11 is rotated, the second connector 12 is also rotated due to the clutch plate 49 coupling the first and second connectors 11, 12.

The clutch plate 49 comprises a wavy or undulating surface 56 and the outer tubular member 28 comprises a wavy or undulating surface 57. The undulations of surface 56 correspond to the undulations of surface 57 so that the surfaces 56, 57 fit together.

The surface 56 of the clutch plate 49 is urged against the surface 57 of the outer tubular member 28 by the biasing member 55. When a torque is exerted on the first connector 11 by the drive mechanism 2 to rotate the first connector 11, the first connector 11 and clutch plate 49 are urged to rotate relative to the second tubular member 28 such that the surface 56 of the clutch plate 49 is urged to rotate relative to surface 57 of the second tubular member 28. This causes the undulations of the surface 56 to engage with the undulations of the surface 57 such that a force is exerted on the clutch plate 49 that urges the clutch plate 49 in the opposite direction to the first axial direction X, against the force of the biasing member 55.

If this force exerted on the clutch plate 49 is insufficient to overcome the force of the biasing member 55, due to the torque applied to the first connector 11 being below the predetermined torque level of the clutch mechanism 48 or there being no, or substantially no, external holding force on the second connector 12 such that the second connector 12 is free to rotate with the first connector 11, then engagement of the surfaces 56, 57 prevents relative movement of the clutch plate 49 relative to the outer tubular member 28. Therefore, rotation of the first connector 11, which is rotationally fixed relative to the clutch plate 49 via the feet 51 and tracks 52, relative to the second connector 12 is prevented.

If said force exerted on the clutch plate 49 is sufficient to overcome the force of the biasing member 55 then the clutch plate 49 slides away from the second tubular member 28, in the opposite direction to the first axial direction X, the feet 51 of the clutch plate 49 sliding within the tracks 52 of the coupling member 15. This allows for rotation of the first connector 11 relative to the second connector 12, such relative rotation no longer being resisted by the clutch plate 49. Such a situation may occur where the torque applied by the drive mechanism 2 is larger than the predetermined torque level of the clutch mechanism 48 and furthermore the second connector 12 is held stationary, for instance, having been screwed on the valve body 6. In such a scenario, the surfaces 56, 67 will engage such that the clutch plate 49 moves against the biasing force of the biasing member 55 such that the surfaces 56, 57 slip relative to each other. Therefore, the first connector 11 and clutch plate 49 will rotate relative to the stationary second connector 12, which will result in rotation of the opening portion 7 of the valve 1 to open/close the valve 1 as will be explained in more detail below. The clutch mechanism 48 therefore prevents the valve 1 being opened/closed until a torque above the predetermined torque level is applied to the first connector 11 by the drive mechanism 2.

If the torque is reduced to below the predetermined torque level, then the biasing member 55 will urge the clutch plate 49 into engagement with the second connector 11, 12 such that the surfaces 56, 57 no longer slip and thus rotation of the first connector 11 causes rotation of the second connector 12 on to the valve 1.

In alternate embodiments (not shown), one of the undulating surfaces 56, 57 is replaced by one or more projections that engage with the other one of the undulating surfaces 56, 57. Movement of the or each projection relative to said other one of the undulating surfaces 56, 57 results in the clutch plate 49 being urged away from the outer tubular member 28 against the biasing force of the biasing member 55. In yet further embodiments (not shown), both of the undulating surfaces 56, 57 are omitted and are replaced by cooperating features that translate rotational movement between the clutch plate 49 and outer tubular member 28 into axial movement of the clutch plate 49 away from the outer tubular member 28. The cooperating features may comprise, for example, angled projections, cam surfaces or the like. In some embodiments, the clutch mechanism 48 may rely on friction surfaces between the clutch plate 49 and second connector 12 to couple the first and second connectors 11, 12. Therefore, when a torque is applied to the first connector 11 that exceeds the friction between the clutch plate 49 and second connector 12, the clutch plate 49 will slip relative to the second connector 12 to allow relative rotation between the first and second connectors 11, 12. In one such embodiment (not shown), the biasing member of the clutch mechanism 48 is omitted.

In an alternative embodiment (not shown), the clutch plate 49 is rotationally fixed relative to the second connector 12 and has a portion that engages with the first connector 11. For instance, the clutch plate 49 may be slidably received in an end of the second connector 12 such that feet of the clutch plate 49 are received in respective tracks in an inside surface of the second connector. The clutch plate 49 is biased into engagement with the first connector 11 by a biasing member. If the torque applied to the first connector 11 exceeds a predetermined torque level then the clutch plate 49 is slid away from the first connector 11 against the force of the biasing member such that the first connector 11 can freely rotate relative to the second connector 12.

In some embodiments, the clutch plate 49 is generally cone-shaped such that the undulating surface 56 is angled with respect to the axial and radial directions. Similarly, the undulating surface 57 of the outer tubular member 28 is angled with respect to the axial and radial directions to face towards the undulating surface 56 of the clutch plate 49. However, it should be recognised that in other embodiments (not shown), the surfaces 56, 57 may not be angled and instead may face axially, towards each other.

An exemplary operation of the coupling 10 will now be described for fluidly connecting a first spacecraft S1 to a second spacecraft S2.

First, the drive mechanism 2 is coupled to the first connector 11. In the present embodiment, the actuating arm 3A grips the actuation portion 17B of the second tubular member 17 of the coupling member 15.

In some embodiments, the actuating arm 3A comprises a spanner or wrench for gripping the actuation portion 17B of the second tubular member 17. Alternatively, the drive member may comprise, for instance, a sleeve (not shown) with a recess (not shown), that is configured to receive the actuation portion 17B of the second tubular member 17 such that rotation of the sleeve also rotates the second tubular member 17. The actuating arm 3A may alternatively engage with a different part of the first connector 11. In some embodiments, the actuating arm 3A comprises the tool 3B or the tool 3B may be an attachment on the actuating arm 3A or gripped by the actuating arm 3A. In another embodiment, the actuating arm 3A and tool 3B are separate components that are driven by independent first and second drives of the drive mechanism. In other embodiments, the actuation portion 17B of the second tubular member 17 has a non-circular cross-section and a recess of a sleeve of the drive mechanism 2 corresponds to the shape of the actuation portion 17B. The sleeve may be driven by the actuating arm 3A. For instance, the cross-sectional outline of the actuation portion 17B is hexagonal and the recess also has a hexagonal cross-section to receive the actuation portion 17B and couple thereto. However, it should be recognised that the actuation portion 17B and the recess in the sleeve of the drive mechanism may have a different shape, for example, oval, triangular, square, rectangular, or octagonal. The shape of the recess does not need to be the same as the shape of the actuation portion 17B, providing the space is shaped to allow for the drive mechanism 2 to grip the actuation portion 17B such that the components rotate together. In some embodiments (not shown), the actuation portion 17B is circular and has an engaging feature, for example, a protrusion/groove, that engages with a corresponding engaging feature in the sleeve of the drive mechanism 2, for example, a groove/protrusion.

Once the drive mechanism 2 has been coupled to the actuation portion 17B of the second tubular member 17, the drive mechanism 2 is operated to rotate the second tubular member 17 in the first rotational direction such that the first connector 11 rotates. Each lock 13 is initially in the locked state and therefore the locking pins 36 fix the second connector 12, actuating member 14 and coupling member 15 relative to each other. Thus, rotation of the first connector 11 by the drive mechanism 2 causes rotation of the second connector 12 together with the first connector 11 such that the threaded bore 29 of the inner tubular member 27 is screwed on to the thread 8 of the valve 1.

The drive mechanism 2 is operated to rotate the first connector 11 by applying a first torque. The first torque is less than the release torque of the combined locks 13, that is, the first torque is less than the torque that must be exerted on the first connector 11 to break the locking pins 36.

Each lock 13 is initially in a locked state wherein the lock 13 holds the actuating member 14 in the retracted positon relative to the coupling member 15, against the force of the biasing member 23. More specifically, since the first end 37 of each locking pin 36 is received in the respective recess 39 in the outer tubular member 28 of the second connector 12, each locking pin 36 extends through the aperture 40 in the connecting member 15, and the second end 38 of each locking pin 36 extends through the respective aperture 41 in the actuating member 14. Therefore, the locking pins 36 fix the second connector 12, actuating member 14 and coupling member 15 relative to each other. Therefore, the actuating member 14 is prevented from moving axially relative to the coupling member 15 under the biasing force of the biasing member 23.

The threaded bore 29 is screwed on to the thread of the valve 1 until the end 6A of the valve body 6 abuts an internal surface 27A of the inner tubular member 27 that faces towards the valve body 6. The internal surface 27A acts as a stop portion 27A that prevents further rotational movement of the inner tubular member 27 relative to the valve body 6. In some embodiments, the stop 27A fluidly seals against the valve body 6. In one such embodiment (not shown), the stop 27A comprises a ring of resilient material, for example, rubber or plastic, that seals against the valve body 6. The threaded bore 29 is screwed on to the valve 1 until the end 6A of the valve body 6 compresses the resilient material, wherein the resilient material seals against said end 6A and acts as a stop to prevent further rotation of the threaded bore 29 on to the valve body 6.

In other embodiments (not shown), the second connector 12, for example, the inner tubular member 27, may comprise one or more projections (not shown) or other features that engage with the valve 1. The or each projection comprises a stop that limits rotational movement between the inner tubular member 27 and the valve 1 once the threaded bore 29 has been screwed on to the thread 8 of the valve 1. In some embodiments (not shown), a projection on the inner tubular member 27 abuts a corresponding projection on the valve body 6 once the threaded bore 29 has been screwed on to the thread 8 of the valve 1 to prevent further relative rotation between the second connector 12 and the valve 1.

The stop portion 27A may comprise an end face or internal/external surface or other feature of the second connector 12 that abuts an end face or internal/external surface or other feature of the valve 1 to prevent further relative rotation between the second connector 12 and the valve 1.

Once the stop 27A engages the valve 1, further rotation of the second connector 12 relative to the valve 1 is prevented such that continued operation of the drive mechanism 2 to rotate the first connector 11 causes a force to be exerted on the locking pin 36 of each lock 13. However, since the drive mechanism 2 is initially operated to rotate the first connector 11 at less than the release torque, each lock 13 remains in the locked state once the second connector 12 has been screwed on to the valve body 6.

With the stop 27A engaging the valve 1, the drive mechanism 2 is then operated to rotate the first connector 11 by exerting a second torque on the first connector 11 that is greater than the first torque and is greater than the release torque of the locks 13. This causes the locks 13 to move to an unlocked state. In the present embodiment, operation of the drive mechanism 2 at the second torque breaks each locking pin 36 at the neck portion 47. Therefore, whilst the first end 37 of each locking pin 36 remains in the respective recess 39 of the outer tubular member 28, the remainder of the locking pin 36 is moved radially outwardly under the force of the respective leaf spring 42 such that each locking pin 36 is no longer received within the respective aperture 40 in the second tubular member 17 of the coupling member 15 and thus each lock 13 is moved to an unlocked state. Therefore, the first connector 11 is able to rotate relative to the second connector 12 and the actuating member 14 is able to slide axially relative to the coupling member 15.

In an alternative to the above, the first torque is greater than the release torque of the combined locks 13 such that when the stop 27A engages the valve 1 and thus the second connector 12 no longer rotates freely, the locks 13 automatically move to the unlocked state due to a force being exerted on the locks 13, without having to apply a second torque that is higher than the first torque.

With each lock 13 moved to the unlocked state, the actuating member 14 slides axially relative to the coupling member 15 in the first axial direction X under the force of the biasing member 23.

In some embodiments, the actuating member 14 is of sufficient axial length to couple to the opening portion 7 of the valve 1 when the lock 13 is moved to the unlocked state and the actuating member 14 moves in the first axial direction X under the force of the biasing member 23. Therefore, if the space 26A in the sleeve 24 of the actuating member 14 is rotationally aligned with the opening portion 7 of the valve 1 then the actuating member 14 will side in the first axial direction X under the force of the biasing member 23 until at least a portion of the opening portion 7 of the valve 1 is received in the space 26A. If the space 26A in the sleeve 24 is not initially rotationally aligned with the opening portion 7 of the valve 1 when the lock 13 first moves to the unlocked state, then the opening portion 7 will not fit within the sleeve 24 and instead the second end 26 of the sleeve 24 will be urged against an end face 7A of the opening portion 7 by the biasing member 23. However, once each lock 13 is moved to the unlocked state, continued operation of the drive mechanism 2 to rotate the first connector 11 will cause the first connector 11 to rotate relative to the second connector 12 and thus cause the actuating member 14 to rotate relative to the opening portion 7. This will result in the space 26A in the sleeve 24 becoming rotationally aligned with the opening portion 7 of the valve 1 such that the actuating member 14 further sides in the first axial direction X under the force of the biasing member 23 until at least a portion of the opening portion 7 of the valve 1 is received in the space 26A. It should be recognised that in such embodiments the threads 34, 35 of the interface 33 may be replaced by an alternative coupling between the first and second connectors 11, 12 that permits relative rotation of the first and second connectors 11, 12 whilst preventing relative axial displacement of the first and second connectors 11, 12. For instance, one of the first and second connectors 11, 12 may comprise a circumferential groove and the other one of the first and second connectors 11, 12 may comprise a projection that is received in the groove and can slide circumferentially within the groove to permit relative rotation of the connectors 11, 12.

In other embodiments, the actuating member 14 does not engage the opening portion 7 of the valve 1 when the lock 13 is first moved to the unlocked state. This could be because the actuating member 14 is not of sufficient axial length and/or there is not sufficient axial movement of the actuating member 14 in the first axial direction X under the force of the biasing member 23 for the actuating member 14 to engage the opening portion 7. Therefore, when the locks 13 move to the unlocked state and the actuating member 14 is urged in the first axial direction X under the force of the biasing member 23, the first end 25 of the sleeve 24 of the actuating member 14 remains spaced from the opening portion 7 of the valve 1. In such a scenario, once each lock 13 is moved to the unlocked state, continued operation of the first drive of the drive mechanism 2 to rotate the first connector 11 will cause the first connector 11 to rotate relative to the second connector 12 (or operation of the second drive when the tool 3 is connected to the first connector 11). This causes the internal thread 35 of the second tubular member 17 of the first connector 11 to engage with the external thread 34 of the inner tubular member 27 of the second connector 12 such that the rotation of the first connector 11 relative to the second connector 12 causes the first connector 11 to move in the first axial direction X relative to the second connector 12. This causes the actuating member 14 of the first connector 11 to move in the first axial direction X relative to the second connector 12 such that the opening portion 7 of the valve 1 is received in the space 26A of the actuating member 14 and thus the actuating member 14 is coupled to the opening portion 7.

Once the opening portion 7 is received in the space 26A of the sleeve 24, the opening portion 7 is rotationally fixed relative to the sleeve 24. The actuating arm 3A is then optionally disconnected from the first connector 11.

Next, the tool 3B of the first spacecraft S1 is connected to the first connector 11 by inserting the flanged end 16B of the first tubular member 16 into the space 4A of the tool 3B such that the first and second engaging elements 5A, 5B and the alignment element 5C of the tool 3B pass through the respective slots 16C, 16D, 16E in the flanged end 16B. This causes the first and second engaging elements 5A, 5B to enter the grooves 18 of the first tubular member 16.

The second drive of the drive mechanism 2 is then operated to rotate the tool 3B in a first rotational direction relative to the first tubular member 16 such that the first and second engaging elements 5A, 5B move along the grooves 18 and thus the tool 3B is drawn axially on to the first tubular member 16 until the tool 3B forms a sealed connection over the first tubular member 16. In particular, the second drive of the drive mechanism 2 is operated to exert a third torque on the tool 3B to rotate the tool 3B relative to the first connector 11.

The third torque is less than the predetermined torque level of the clutch mechanism 48. Therefore, accidental opening/closing of the valve 1, for example, if the tool 3B snags or catches on the first tubular member 16, is prevented. In more detail, if the tool 3B snags on the first tubular member 16 during connection of the tool 3B to the first tubular member 16, then the third torque will be exerted on the first tubular member 16 urging the first tubular member 16, and thus the remainder of the first connector 11, to rotate relative to the second connector 12. However, the third torque is less than the predetermined torque level required to slip or disengage the clutch mechanism 48 and thus the first connector 11 remains rotationally fixed relative to the second connector 12 by the clutch mechanism 48, since the clutch plate 49 is engaged with the outer tubular member 28. Moreover, the second connector 12 is rotationally fixed to the valve body 6 since the stop 27A is engaged by the valve 1, and thus the second connector 11 is also rationally fixed to the valve body 6 by virtue of the clutch mechanism 48. The valve body 6 is rotationally fixed relative to the body of the second spacecraft S2 or another component. Therefore, the first and second connectors 11, 12 are prevented from rotating when the third torque is applied to the first connector 11 and thus the third torque being exerted on the first connector 11 does not cause the actuating member 14 to rotate the opening portion 7 of the valve 1. Thus, accidental opening of the valve 1 during fluid connection of the tool 3B to the valve 1 is prevented, which could otherwise result in the leakage of fluid into space.

Once the tool 3B has been connected to the first connector 11, further rotation of the tool 3B in the first rotational direction relative to the first tubular member 16 is prevented, for instance, by the tool 3B abutting the magnetic member 19 and/or by the engaging elements 5A, 5B reaching the end of the respective grooves 18. The magnetic member 19 helps to retain the tool 3B on the first tubular member 16.

To open the valve 1, the second drive of the drive mechanism 2 is operated to exert a fourth torque on the tool 3B which causes the torque to be exerted on the first tubular member 16 to rotate the first connector 11 in the first rotation direction. The fourth torque is greater than the predetermined torque level of the clutch mechanism 48. Therefore, said operation of the drive mechanism 2 causes the first connector 11 to rotate such that the clutch plate 49 moves axially away from the outer tubular member 28, against the force of the biasing member 55, such that the clutch plate 49 disengages or slips relative to the outer tubular member 28 resulting in rotation of the first connector 11 relative to the second connector 12. The second connector 12 may remain stationary due to the stop 27A of the second connector 12 abutting the valve body 6. The first connector 11 rotates such that the actuating member 14 is rotated to rotate the opening portion 7 of the valve 1 thereby opening the valve 1.

Once the valve 1 has been opened, fluid can be transferred between the first and second spacecraft S1, S2, the fluid travelling through the valve 1, coupling 10 and tool 3B. The valve 1 comprises a bore 9 that allows for fluid to pass through the valve 1. The coupling 10, comprises passage 20, space 21, bore 27, passage 31 and aperture 59 that facilitate a fluid path through the coupling 10. The tool 3B comprises a conduit (not shown) that allows for fluid to be transferred between the first tubular member 16 of the first connector 11 and the first spacecraft S1.

Optionally, on completion of fluid transfer, the drive mechanism 2 can be operated to rotate the first connector 11 is a second rotational direction, opposite to the first rotational direction, to close the valve.

Referring now to FIGS. 21 to 33, a second embodiment of a coupling 100 is shown for fluidly connecting first and second spacecraft (not shown).

The first spacecraft comprises a drive mechanism (not shown) that comprises an actuating arm configured to couple to the coupling 100 for rotating the coupling 100 and a tool configured to couple to the coupling 100 for fluidly connecting to the coupling 100 and rotating the coupling 100. The drive mechanism is the same as the drive mechanism 2 of the first embodiment described with reference to FIGS. 1 to 20.

The second spacecraft comprises a valve 101 that is fluidly connected to a tank in the second spacecraft. The valve 101 is configured to allow for the transfer of fluid to or from a tank (not shown) of the second spacecraft. The valve 101 of the second embodiment is different to the valve 1 of the first embodiment, and the coupling 100 of the second embodiment is configured to open the valve 101.

The valve 101 comprises a generally cylindrical valve body 102 with a central passage 103 to selectively permit the transfer of fluid to or from the tank of the second spacecraft when the valve 101 is open. The valve body 102 is fixed relative to the second spacecraft. The central passage 103 has a circular cross-section.

An opening portion 105 is received within the central passage 103. The opening portion 105 is rotatable relative to the valve body 102 to open/close the valve 101. The opening portion 105 comprises a central bore 105A with a non-circular cross-section. The opening portion 105 is configured to be engaged by the coupling 100. The opening portion 105 may be located within a part of the central passage 103 that is distal to the coupling 100.

The valve body 102 has an external thread 106 on a peripheral surface of the valve body 102 (shown in FIG. 22, not shown in FIG. 23), at an end 102A of the valve body 102 that is proximal to the coupling 100. The central passage 103 extends into said end 102A.

In the present embodiment, the valve 101 is of a type wherein the opening portion 105 is rotated in a first rotational direction to open the valve 101 and is rotatable in an opposite second rotational direction to close the valve 101. Such valves will be known to the skilled person. For instance, the valve 101 may be manufactured by Nammo™ or MOOG™, including the MOOG VCo3 Fill and Drain Valve. However, it should be recognised that the coupling 100 may be configured for use with other types of valves by the same or other manufacturers.

The coupling 100 of the second embodiment is similar to the coupling 10 of the first embodiment, with like features retaining the same reference numerals. The coupling 100 of the second embodiment is configured to open a different type of valve 101.

A difference is that the sliding actuating member 14 is replaced with an alternative configuration of actuating member 114. Another difference is that the coupling 100 comprises an extension member 107.

The extension member 107 comprises a generally cylindrical base 108 with a flanged end 109. A longitudinal member no of the extension member 107 projects from the centre of the flanged end 109 and extends towards the valve 101, along the central axis A-A of the coupling 100. The longitudinal member no may comprise a rod 110.

An external thread 11 is provided on a peripheral surface of the base 108. The external thread 11 is configured to engage with an internal thread 112 provided on the inside of the first tubular member 16. Therefore, the base 108 of the extension member 107 can be screwed into the first tubular member 16 to attach the extension member 107 to the first tubular member 16. The base 108 of the extension member 107 is therefore located within the passage 20 of the coupling member 15 when the coupling 100 is assembled.

The extension member 107 further comprises apertures 113B in the longitudinal member 110 that fluidly communicate with a bore 113B in the base 108 to allow fluid to flow through the extension member 107. Therefore, fluid is able to pass through the passage 20 of the coupling member 15 via the apertures 113B and bore 113B.

The first connector 11 therefore comprises the coupling member 15 and actuating member 114, wherein the coupling member 15 comprises the first and second tubular members 16, 17 and the extension member 107. In the present embodiment, the first and second tubular members 16, 17 are attached via threads 16A, 17A, and the first tubular member 16 and the extension member 107 are attached via threads 111, 112. However, it should be recognised that other means may be used to attach these components, for example, adhesive, welds or fasteners such as screws. In some embodiments, two or more of the first and second tubular members 16, 17 and the extension member 107 may be integrally formed. In one such embodiment (not shown), the first and second tubular members 16, 17 and the extension member 107 are formed from a single portion of material.

The actuating member 114 comprises a base 115 and an engaging portion 116 that extends longitudinally from the base 115 towards the valve 101. In the present embodiment, the engaging portion 116 has a hexagonal cross-section that corresponds to the opening portion 105 of the valve 101.

A passage 117 extends through the actuating member 114, through the base 115 and engaging portion 116. The end of the longitudinal member 110 of the extension member 107 is received within the passage 117 such that the actuating member 114 is slidable relative to the extension member 107 along the central axis A-A of the coupling 100.

The longitudinal member 110 is shaped such that the extension member 107 is fixed rotationally relative to the actuating member 114 when the longitudinal member 110 is received in the passage 117. Therefore, rotation of the extension member 107 results in corresponding rotation of the actuating member 114. In the present embodiment, the longitudinal member no comprises first and second surfaces 110A, 110B that engage corresponding first and second surfaces 116A, 116B of the engaging portion 116 to form a rotational coupling therebetween. A gap (not shown) may be provided between a surface of the longitudinal member 110 and a surface of the engaging portion 116 to allow for fluid to flow along the passage 117 in the gap between the longitudinal member 110 and the engaging portion 116.

In alternative embodiments (not shown) a groove may be provided in one or more of the longitudinal member 110 and actuating member 114 to allow for fluid to flow along the groove. In yet another embodiment (not shown), a passage is provided through the longitudinal member 110 to allow for fluid to flow along the longitudinal member 110.

A plurality of projections 18 extend radially outwardly from the base 115 such that a space 15A is formed by the projections 118 for receiving a first end of a biasing member 120. With the actuating member 114 received on the extension member 107, the projections 118 are proximate to the base 108 of the extension member 107 and the engaging portion 116 extends away from the base 108 of the extension member 107. The base 108 of the extension member 107 comprises an annular recess 108A that receives a second end of the biasing member 120.

Figure 33:
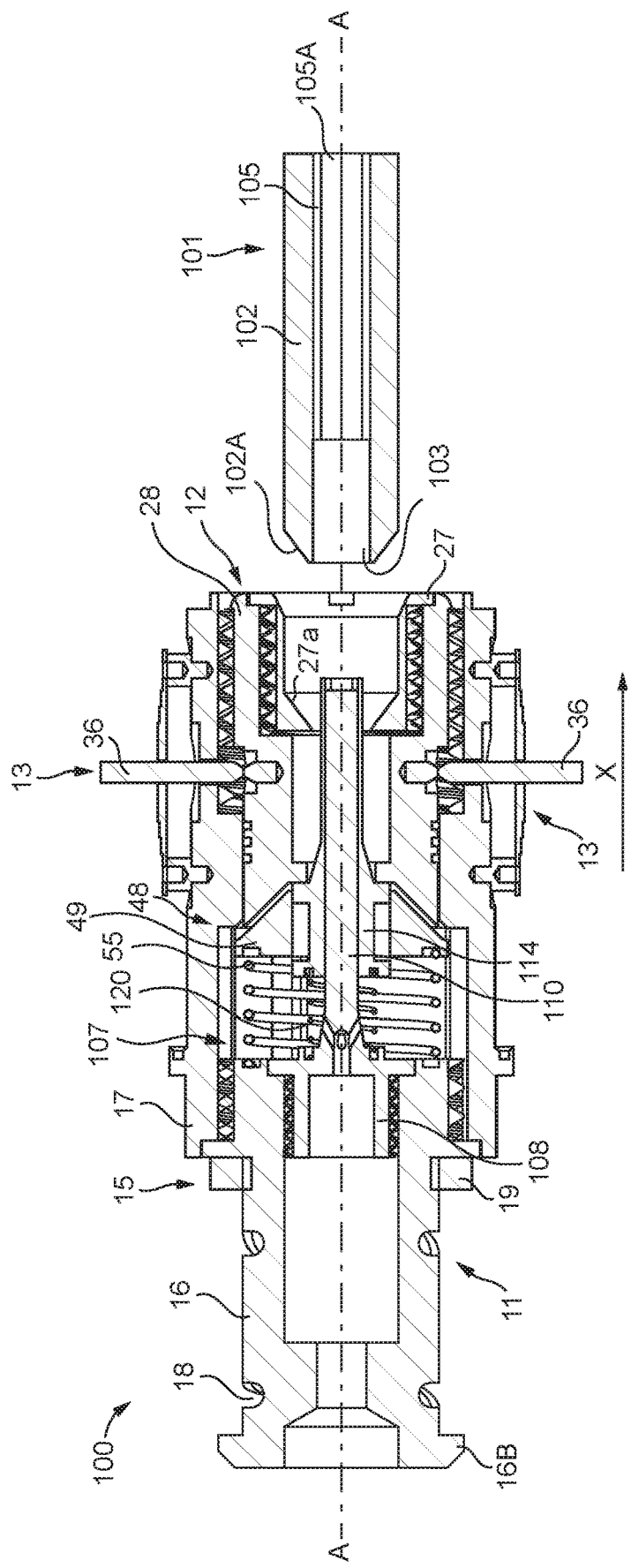
FIG. 33 is a cross-sectional side view of the coupling of FIG. 21 and the valve of FIG. 23.
Figure 34:
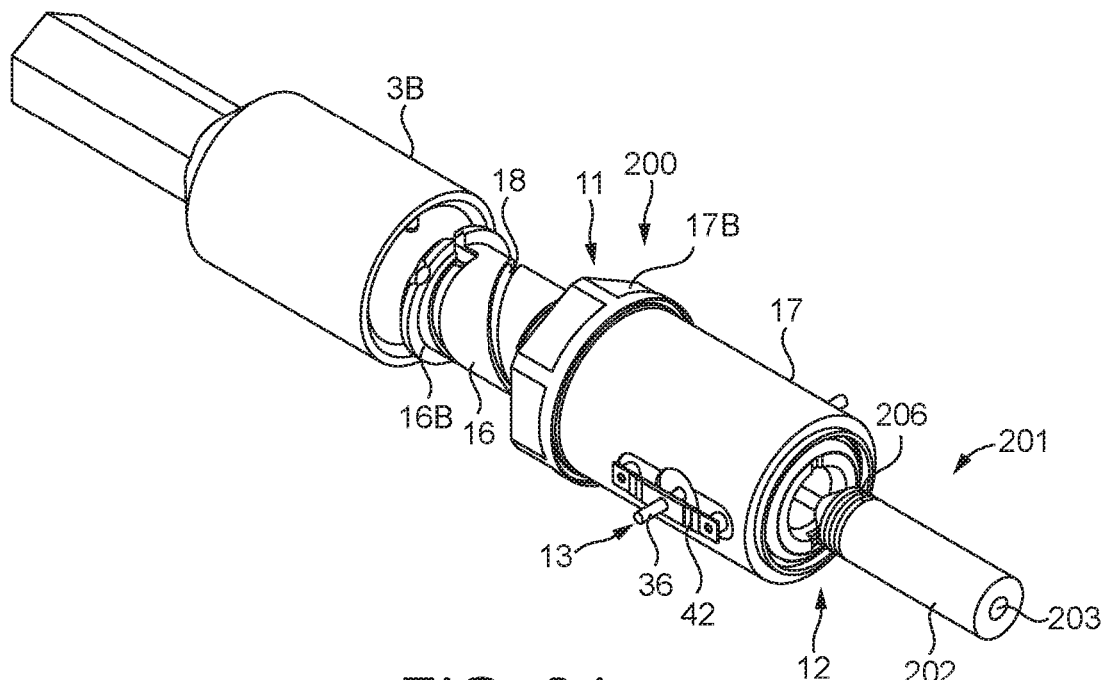
FIG. 34 is a perspective view of a coupling according to a third embodiment.
Figure 35:
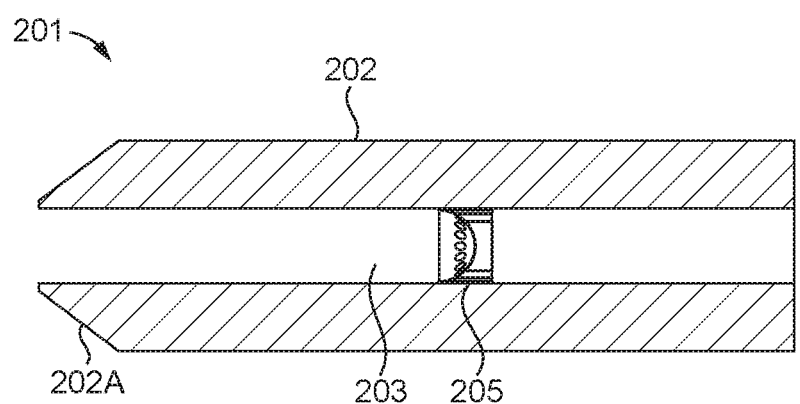
FIG. 35 is a cross-sectional side view of a valve of a second spacecraft, the coupling of FIG. 34 configured to couple to and open the valve.
Figure 36:
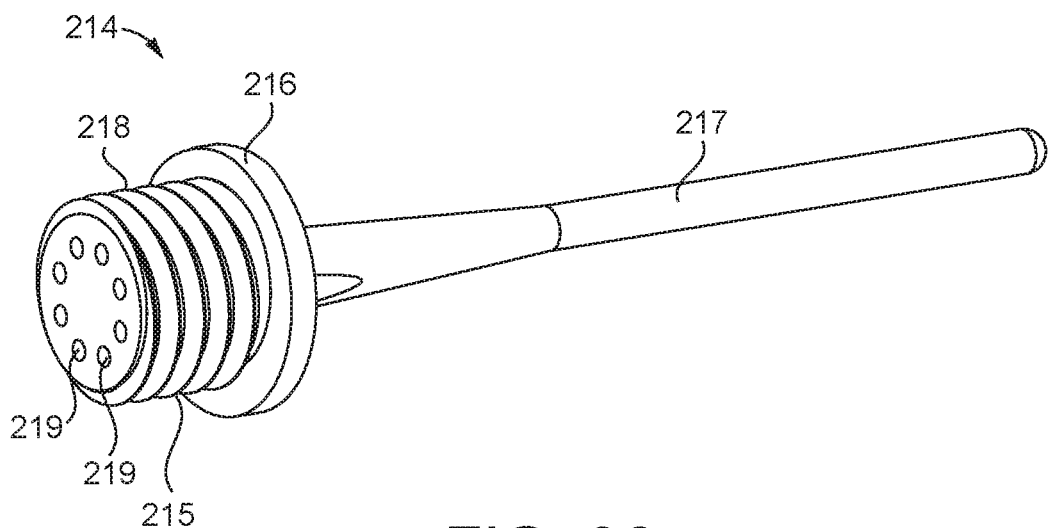
FIG. 36 is a first perspective view of an actuating member of the coupling of FIG. 34.
Figure 37:
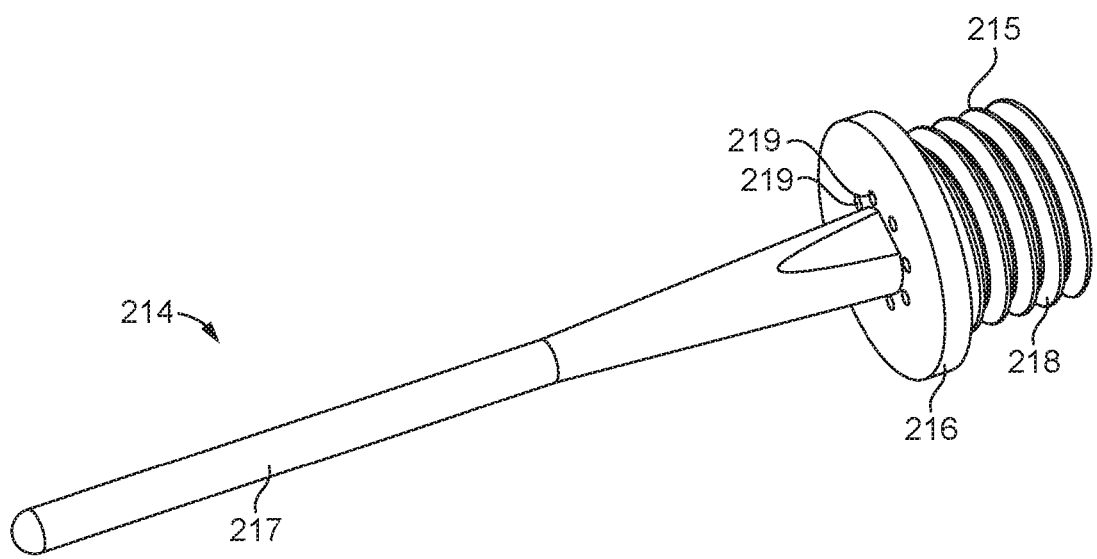
FIG. 37 is a second perspective view of the actuating member of the coupling of FIG. 34.
Figure 38:
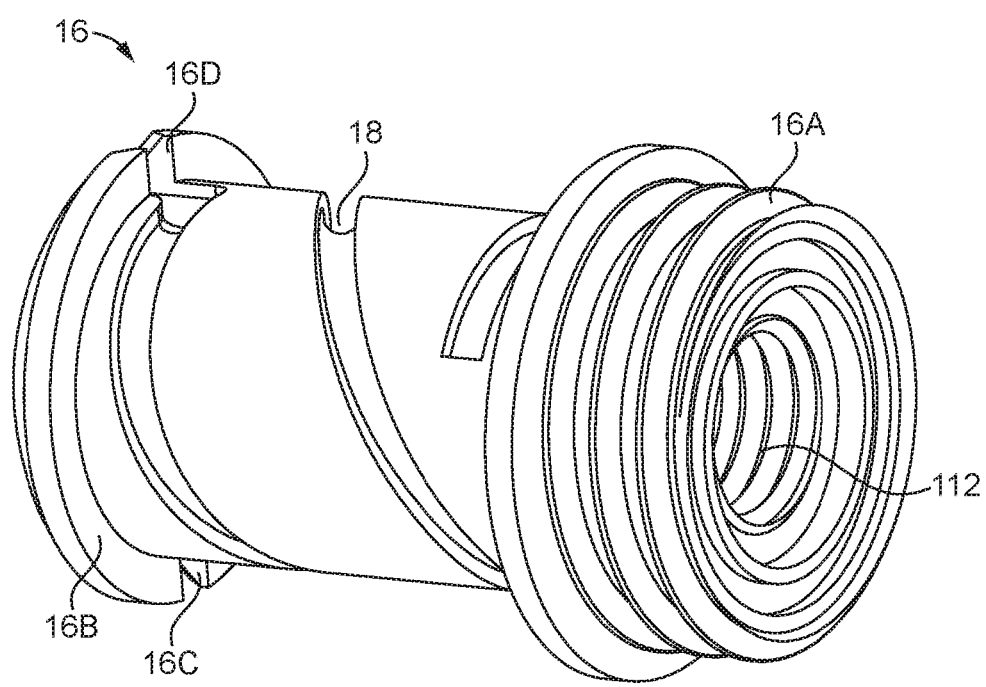
FIG. 38 is a perspective view of a first tubular member of the coupling of FIG. 34.
Figure 39:
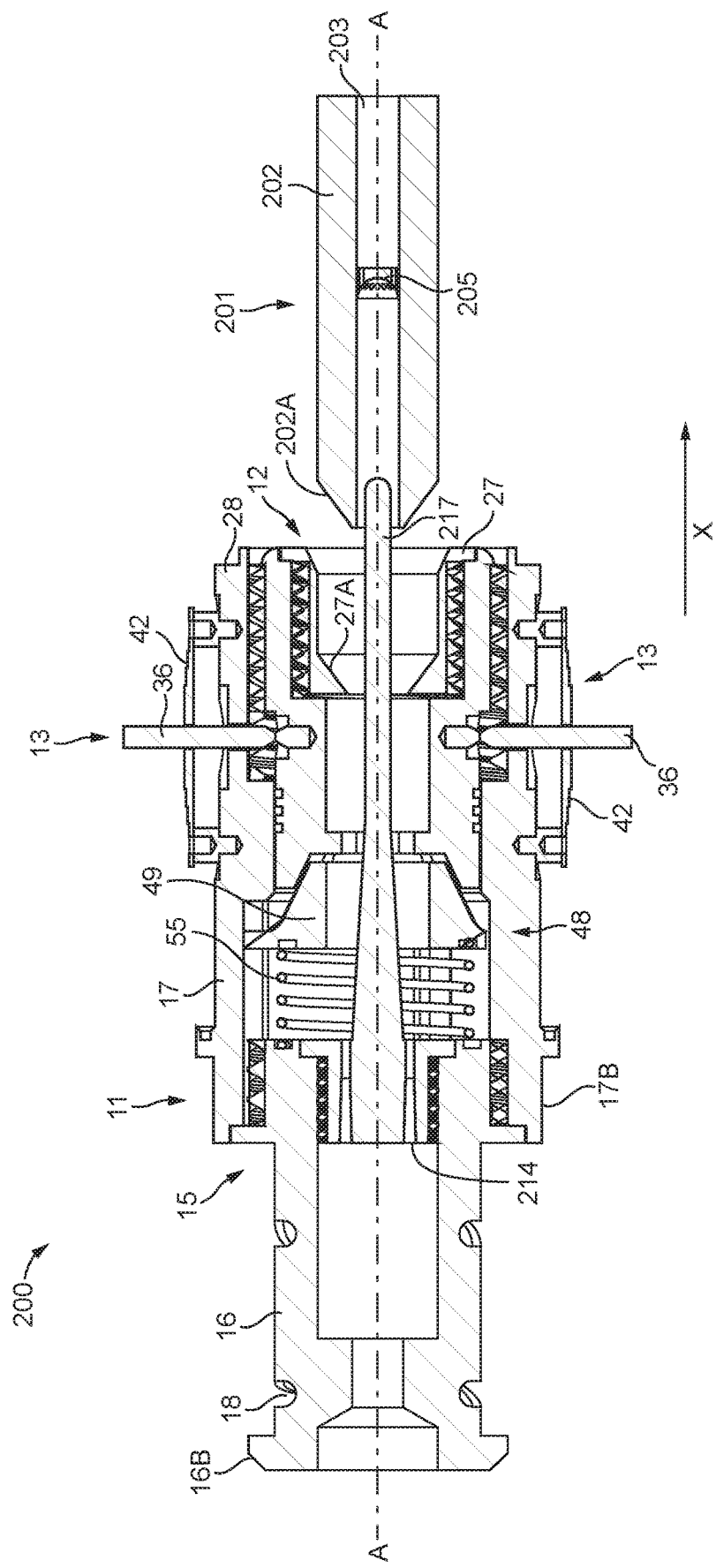
FIG. 39 is a cross-sectional side view of the coupling of FIG. 34 and the valve of FIG. 35; and, FIG. 40 is a schematic flow diagram illustrating a method of connecting a first spacecraft to a second spacecraft.

The biasing member 120 is therefore located between the base 108 of the extension member 107 and the base 115 of the actuating member 114 such that the actuating member 114 is biased away from the extension member 107 in a first axial direction (shown by arrow 'X' in FIG. 33). The biasing member 120 may extend about a portion of the longitudinal member 110 of the extension member 107. In some embodiments, the biasing member 120 is a spring, for example, a helical spring, or may comprise a portion of resilient material.

The actuating member 114 further comprises first and second locking tabs 119A, 119B that extend radially outwardly from the base 115 of the actuating member 114. The locking tabs 119A, 119B initially abut a retaining portion 28A of the outer tubular member 28 such that axial movement of the actuating member 114 in the first axial direction X is prevented. Therefore, the biasing member 120 urges the actuating member 114 in the first axial direction X such that the locking tabs 119A, 119B are urged against the retaining portion 28A. The retaining portion 28A is a surface of the outer tubular member 28 that faces towards the first tubular member 16. In other embodiments (not shown), the retaining portion may comprise a protrusion that abuts the actuating member 114.

The outer tubular member 28 has first and second recesses 28B, 28C that correspond to the locking tabs 119A, 119B to allow for the tabs 119A, 119B to pass through the recesses 28B, 28C when the actuating member 114 is rotated relative to the outer tubular member 28 such that the tabs 119A, 119B and recesses 28B, 28C align. Thus, when the tabs 119A, 119B are aligned with the recesses 28B, 28C, the tabs 119A, 119B no longer abut the retaining portion 28A and thus the actuating member 114 moves in the first axial direction X relative to the extension member 107 under the force of the biasing member 120.

The tabs 119A, 119B and retaining portion 28A therefore form a retaining mechanism that initially prevents movement of the actuating member 114 relative to the extension member 107. In an alternative embodiment (not shown), one of the tabs 119A, 119B is omitted or there are more than two tabs 119A, 119B. In other embodiments (not shown), the coupling 100 comprises a different configuration of retaining mechanism. For instance, the outer tubular member 28 may comprises one or more elements/surfaces that engage respective one or more elements/surfaces of the actuating member 114 to initially prevent the actuating member 114 moving in the first axial direction under the force of the biasing member 120. When the actuating member 114 is rotated relative to the outer tubular member 28 the elements/surfaces of the actuating member 114 and elements/surfaces of the outer tubular member 28 are moved out of engagement such that the actuating member 114 is moved axially under the force of the biasing member 120.

An exemplary operation of the coupling 100 will now be described for fluidly connecting a first spacecraft (not shown) to a second spacecraft (not shown).

First, the drive mechanism is coupled to the first connector 11 in a similar manner to as described in reference to the first embodiment, for example, the actuating arm (not shown) gripping the actuation portion 17B of the second tubular member 17 of the coupling member 15.

Once the drive mechanism has been coupled to the actuation portion 17B of the second tubular member 17, the first drive of the drive mechanism is operated to rotate the second tubular member 17 in a first rotational direction such that the first connector 11 rotates. Each lock 13 is initially in the locked state and therefore the locking pins 36 fix the coupling member 15 of the first connector 11 and the outer tubular member 28 of the second connector 12 relative to each other. Thus, rotation of the first connector 11 by the drive mechanism causes rotation of the second connector 12 together with the first connector 11 such that the threaded bore 29 of the inner tubular member 27 is screwed on to the thread 106 of the valve 101.

The actuating member 114 is initially held in a retracted position against the biasing force of the biasing member 120 since the locking tabs 119A, 119B of the actuating member 114 abut the retaining portion 28A of the outer tubular member 28. The actuating member 114 is prevented from moving in the first axial direction X due to the engagement of the locking tabs 119A, 119B with the retaining portion 28A.

The threaded bore 29 of the inner tubular member 27 of the second connector 12 is screwed on to the thread 106 of the valve 101 until the end 102A of the valve body 102 abuts an internal surface 27A of the inner tubular member 27 that faces towards the valve body 102. The internal surface 27A acts as a stop 27A that prevents further rotational movement of the inner tubular member 27 relative to the valve body 102.

Once the stop 27A engages the valve 101, further rotation of the second connector 12 relative to the valve 101 is prevented such that continued operation of the drive mechanism to rotate the first connector 11 in the first rotational direction causes a force to be exerted on the locking pin 36 of each lock 13. However, since the drive mechanism is initially operated to rotate the first connector 11 at less than the release torque, each lock 13 remains in the locked state once the second connector 12 has been screwed on to the valve body 102.

With the stop 27A engaging the valve 101, the drive mechanism 2 is then operated to rotate the first connector 11 by exerting a second torque on the first connector 11 that is greater than the first torque and is greater than the release torque of the locks 13. This causes the locks 13 to move to an unlocked state. In the present embodiment, operation of the drive mechanism 2 at the second torque breaks each locking pin 36 at the neck portion 47. Therefore, the first connector 11 is able to rotate relative to the second connector 12.

With each lock 13 moved to the unlocked state, continued operation of the first drive of the drive mechanism rotates the first connector 11 in the first rotational direction relative to the second connector 12. This causes the actuating member 114 to rotate relative to the outer tubular member 28 until the locking tabs 119A, 119B align with the recesses 28B, 28C of the outer tubular member 28 such that the locking tabs 119A, 119B are no longer held in position against the retaining portion 28A. This causes the actuating member 114 to move in the first axial direction X relative to the extension member 107 under the force of the biasing member 120 such that the actuating member 114 moves towards an extended position. The actuating member 114 enters the central passage 103 of the valve 101.

In some embodiments, the actuating member 114 is of sufficient axial length such that the engaging portion 116 is received in the opening portion 105 of the valve 101 when the lock 13 is moved to the unlocked state and the actuating member 114 moves in the first axial direction X under the force of the biasing member 120. Therefore, if the engaging portion 116 of the actuating member 114 is rotationally aligned with the opening portion 105 of the valve 101 when the lock 13 is moved to the unlocked state then the actuating member 114 will side in the first axial direction X under the force of the biasing member 120 until it reaches an extended position wherein at least a portion of the engaging portion 116 of the actuating member 114 is received within the opening portion 105 of the valve 101.

If the engaging portion 116 of the actuating member 114 is not rotationally aligned with the opening portion 105 of the valve 101 when the lock 13 first moves to the unlocked state, then the engaging portion 116 will not fit within the opening portion 105 and instead the engaging portion 116 will abut a portion an end of the opening portion 105 that faces towards the connector 100. The biasing member 120 will urge the engaging portion 116 against said end of the opening portion 105. However, once each lock 13 is moved to the unlocked state, continued operation of the drive mechanism to rotate the first connector 11 will cause the first connector 11 to rotate relative to the second connector 12 and thus the actuating member 114 to rotate relative to the opening portion 105 of the valve 101. This will cause the engaging portion 116 of the actuating member 114 to rotationally align with the opening portion 105 of the valve 101 such that the actuating member 114 further sides in the first axial direction X under the force of the biasing member 120 to reach an extended position wherein at least a portion of the engaging portion 116 of the actuating member 114 is received within the opening portion 105 of the valve 101.

It should be recognised that in such embodiments the threads 34, 35 of the interface 33 may be replaced by an alternative coupling between the first and second connectors 11, 12 that permits relative rotation of the first and second connectors 11, 12 whilst preventing relative axial displacement of the first and second connectors 11, 12. For instance, one of the first and second connectors 11, 12 may comprise a circumferential groove and the other one of the first and second connectors 11, 12 may comprise a projection that is received in the groove and can slide circumferentially within the groove to permit relative rotation of the connectors 11, 12.

In other embodiments, the engaging portion 116 of the actuating member 114 does not enter the opening portion 105 of the valve 101 when the lock 13 is first moved to the unlocked state. This could be because the actuating member 114 is not of sufficient axial length and/or there is not sufficient axial movement of the actuating member 114 in the first axial direction X under the force of the biasing member 120 for the actuating member 114 to engage the opening portion 105. Therefore, when the locks 13 move to the unlocked state and the actuating member 114 is urged in the first axial direction X under the force of the biasing member 120, the engaging portion 116 of the actuating member 114 remains spaced from the opening portion 105 of the valve 101. In such a scenario, once each lock 13 is moved to the unlocked state, continued operation of the drive mechanism 2 to rotate the first connector 11 will cause the first connector 11 to rotate relative to the second connector 12. This causes the internal thread 35 of the second tubular member 17 of the first connector 11 to engage with the external thread 34 of the inner tubular member 27 of the second connector 12 such that the rotation of the first connector 11 relative to the second connector 12 causes the first connector 11 to move in the first axial direction X relative to the second connector 12. This causes the actuating member 114 of the first connector 11 to move in the first axial direction X relative to the second connector 12 such that the engaging portion 116 enters the opening portion 105 of the valve 101 and thus the actuating member 114 is coupled to the opening portion 105.

The engaging portion 116 has a hexagonal cross-section that corresponds to the opening portion 105 of the valve 101 such that rotation of the engaging portion 116 results in corresponding rotation of the opening portion 105 relative to the valve body 102. However, it should be recognised that the opening portion 105 of the valve 101 and the engaging portion 116 of the actuating member 114 may have a different shape, for example, oval, triangular, square, rectangular, or octagonal. The shape of the engaging portion 116 of the actuating member 114 does not need to be the same as the shape of the opening portion 105 of the valve 101, providing the components are shaped to allow for the engaging portion 116 to rotate the opening portion 105. In some embodiments (not shown), the opening portion 105 is circular and has an engaging feature, for example, a protrusion/groove, that engages with a corresponding engaging feature of the actuating member 114, for example, a groove/protrusion.

Once the engaging portion 116 of the actuating member 114 is received within the opening portion 105 of the central passage 103 of the valve 101, the actuating member 114 is rotationally fixed relative to the opening portion 105. The actuating arm is then optionally disconnected from the first connector 11.

Next, the tool of the first spacecraft is connected to the first connector 11 in a similar manner to as described in reference to the first embodiment, by inserting the flanged end 16B of the first tubular member 16 into the space of the tool such that the first and second engaging elements of the tool enter the grooves 18 of the first tubular member 16.

The second drive of the drive mechanism is then operated to rotate the tool in a first rotational direction relative to the first tubular member 16 such that the first and second engaging elements move along the grooves 18 and thus the tool is drawn axially on to the first tubular member 16 until the tool forms a sealed connection over the first tubular member 16. In particular, the second drive of the drive mechanism is operated to exert a third torque on the tool to rotate the tool relative to the first connector.

The third torque is less than the predetermined torque level of the clutch mechanism 48. Therefore, accidental opening/closing of the valve 101, for example, if the tool snags or catches on the first tubular member 16, is prevented. In more detail, if the tool snags on the first tubular member 16 during connection of the tool to the first tubular member 16, then the third torque will be exerted on the first tubular member 16 urging the first tubular member 16, and thus the remainder of the first connector 11, to rotate relative to the second connector 12. However, the third torque is less than the predetermined torque level required to slip or disengage the clutch mechanism 48 and thus the first connector 11 remains rotationally fixed relative to the second connector 12 by the clutch mechanism 48, since the clutch plate 49 is engaged with the outer tubular member 28. Moreover, the second connector 12 is rotationally fixed to the valve body 102 since the stop 27A is engaged by the valve 101, and thus the second connector 11 is also rationally fixed to the valve body 102 by virtue of the clutch mechanism 48. The valve body 102 is rotationally fixed relative to the body of the second spacecraft S2 or another component such that the valve body 102 does not rotate relative thereto. Therefore, the first and second connectors 11, 12 are prevented from rotating when the third torque is applied to the first connector 11 and thus the third torque being exerted on the first connector 11 does not cause the actuating member 114 to rotate the opening portion 105 of the valve 101. Thus, accidental opening of the valve 101 during fluid connection of the tool to the valve 101 is prevented, which could otherwise result in the leakage of fluid into space.

Once the tool has been connected to the first connector 11, further rotation of the tool in the first rotational direction relative to the first tubular member 16 is prevented, for instance, by the tool abutting the magnetic member 19 and/or by the engaging elements of the tool reaching the end of the respective grooves 18. The magnetic member 19 helps to retain the tool on the first tubular member 16.

To open the valve 101, the second drive of the drive mechanism is operated to exert a fourth torque on the tool which causes the torque to be exerted on the first tubular member 16 to rotate the first connector 11 in the first rotation direction. The fourth torque is greater than the predetermined torque level of the clutch mechanism 48. Therefore, said operation of the drive mechanism causes the first connector 11 to rotate such that the clutch plate 49 moves axially away from the outer tubular member 28, against the force of the biasing member 55, such that the clutch plate 49 disengages or slips relative to the outer tubular member 28 resulting in rotation of the first connector 11 relative to the second connector 12. The second connector 12 may remain stationary due to the stop 27A of the second connector 12 abutting the valve body 102. The first connector 11 rotates such that the actuating member 114 is rotated to rotate the opening portion 105 of the valve 101 relative to the valve body 102 thereby opening the valve 101.

Once the valve 101 has been opened, fluid can be transferred between the first and second spacecraft, the fluid travelling through the valve 101, coupling 100 and tool. The valve 101 comprises the central passage 103 that allows for fluid to pass through the valve 101. The coupling 100 comprises passage 20, space 21, bore 27, passage 31, aperture 59, the apertures 113B and bore 113B of the extension member 107 and the passage 117 of the actuating member 114, which facilitate a fluid path through the coupling 100. The tool comprises a conduit (not shown) that allows for fluid to be transferred between the coupling 100 and the first spacecraft.

Optionally, on completion of fluid transfer, the drive mechanism can be operated to rotate the first connector 11 is a second rotational direction, opposite to the first rotational direction, to close the valve 101.

Referring now to FIGS. 34 to 39, a third embodiment of a coupling 200 is shown for fluidly connecting first and second spacecraft (not shown).

The first spacecraft comprises a drive mechanism (not shown) that comprises an actuating arm configured to couple to the coupling 200 for rotating the coupling 200 and a tool configured to couple to the coupling 200 for fluidly connecting to the coupling 200 and rotating the coupling 200. The drive mechanism is the same as the drive mechanism 2 of the first embodiment described with reference to FIGS. 1 to 20.

The second spacecraft comprises a valve 201 that is fluidly connected to a tank (not shown) of the second spacecraft. The valve 201 is configured to allow for the transfer of fluid to or from the tank of the second spacecraft. The valve 201 of the third embodiment is different to the valve 1 of the first embodiment, and the coupling 200 of the second embodiment is configured to open the valve 201.

The valve 201 comprises a generally cylindrical valve body 202 with a central passage 203 to selectively permit the transfer of fluid to or from the tank of the second spacecraft when the valve 201 is open. A fluid control member 205 is located within the central passage 203. Initially, the fluid control member 205 is in a closed position such that the flow of fluid through the central passage 203 is prevented. The fluid control member 205 is slidable within the central passage 203 in the first axial direction X such that the fluid control member 205 moves to an open position, wherein the flow of fluid through the valve 201 is permitted.

The valve body 202 has an external thread 206 on a peripheral surface of the valve body 202 (shown in FIG. 34), at an end 202A of the valve body 202 that is proximal to the coupling 200. The central passage 203 extends to said end 202A.

In the present embodiment, the valve 201 is of a type wherein the fluid control member 205 is biased into the closed position, for example, by a spring (not shown). A force can be applied to the fluid control member 205 to slide the fluid control member 205 in the first axial direction X relative to the valve body 202 to open the valve 201. The fluid control member 205 therefore forms an opening portion 205 of the valve 201. The valve 201 can be closed by removing said force from the fluid control member 205 such that the spring biases the fluid control member 205 back to the closed position to seal the valve 201. One such valve 201 is manufactured by Ariane Group™.

Examples of Ariane Group™ valves are the Fill and Drain/Vent valves such as the Fuel Fill Valve, Fuel Vent Valve, High Pressure Helium Valve, Low Pressure Helium Valve, Oxidiser Fill Valve, Oxidiser Vent Valve, Fill and Drain Valve Propellant Loading, and High Pressure Xenon Valve. However, it should be recognised that the aforementioned list is not limiting and the coupling 10 may be configured for use with other types of valves by the same or other manufacturers.

The coupling 200 of the third embodiment is similar to the coupling 10 of the first embodiment, with like features retaining the same reference numerals. The coupling 200 of the third embodiment is configured to open a different type of valve.

A difference is that the sliding actuating member 14 of the first embodiment is replaced with an alternative configuration of actuating member 214.

The actuating member 214 comprises a generally cylindrical base 215 with a flanged end 216. A longitudinal member 217 of the actuating member 214 projects from the centre of the flanged end 216 and extends towards the valve 201, along the central axis A-A of the coupling 200. The longitudinal member 217 may comprise a rod 217.

An external thread 218 is provided on a peripheral surface of the base 215. The external thread 218 is configured to engage with an internal thread 112 provided on the inside of the first tubular member 16. Therefore, the base 215 of the actuating member 214 can be screwed into the first tubular member 16 to attach the actuating member 214 to the first tubular member 16. The base 215 of the actuating member 214 is therefore located within the passage 20 of the coupling member 15 when the coupling 200 is assembled.

The actuating member 214 further comprises one or more apertures 219 that extend through the base 215 to allow fluid to flow through the actuating member 214. Therefore, fluid is able to pass through the passage 20 of the coupling member 15 via the apertures 219.

The first connector 11 therefore comprises the coupling member 15 and the actuating member 214, wherein the coupling member 15 comprises the first and second tubular members 16, 17. In the present embodiment, the first and second tubular members 16, 17 are attached via threads 16A, 17A, and the first tubular member 16 and the actuating member 214 are attached via threads 112, 218. However, it should be recognised that other means may be used to attach these components, for example, adhesive, welds or fasteners such as screws. In some embodiments, two or more of the first and second tubular members 16, 17 and the actuating member 214 may be integrally formed. In one such embodiment (not shown), the first and second tubular members 16, 17 and the actuating member 214 are formed from a single portion of material.

An exemplary operation of the coupling 200 will now be described for fluidly connecting a first spacecraft (not shown) to a second spacecraft (not shown).

First, the drive mechanism is coupled to the first connector 11 in a similar manner to as described in reference to the first embodiment, for example, the actuating arm (not shown) gripping the actuation portion 17B of the second tubular member 17 of the coupling member 15.

Once the drive mechanism has been coupled to the actuation portion 17B of the second tubular member 17, the first drive of the drive mechanism is operated to rotate the second tubular member 17 in a first rotational direction such that the first connector 11 rotates. Each lock 13 is initially in the locked state and therefore the locking pins 36 fix the coupling member 15 of the first connector 11 and the outer tubular member 28 of the second connector 12 relative to each other. Thus, rotation of the first connector 11 by the drive mechanism causes rotation of the second connector 12 together with the first connector 11 such that the threaded bore 29 of the inner tubular member 27 is screwed on to the thread 206 of the valve 201.

The threaded bore 29 of the inner tubular member 27 of the second connector 12 is screwed on to the thread 206 of the valve 201 until the end 202A of the valve body 202 abuts an internal surface 27A of the inner tubular member 27 that faces towards the valve body 202. The internal surface 27A acts as a stop 27A that prevents further rotational movement of the inner tubular member 27 relative to the valve body 202.

Once the stop 27A engages the valve 201, further rotation of the second connector 12 relative to the valve 201 is prevented such that continued operation of the drive mechanism to rotate the first connector 11 in the first rotational direction causes a force to be exerted on the locking pin 36 of each lock 13. However, since the drive mechanism is initially operated to rotate the first connector 11 at less than the release torque, each lock 13 remains in the locked state once the second connector 12 has been screwed on to the valve body 202.

With the stop 27A engaging the valve 201, the drive mechanism 2 is then operated to rotate the first connector 11 by exerting a second torque on the first connector 11 that is greater than the first torque and is greater than the release torque of the locks 13. This causes the locks 13 to move to an unlocked state. In the present embodiment, operation of the drive mechanism 2 at the second torque breaks each locking pin 36 at the neck portion 47. Therefore, the first connector 11 is able to rotate relative to the second connector 12.

Next, the tool 3B of the first spacecraft is connected to the first connector 11 in a similar manner to as described in reference to the first embodiment, by inserting the flanged end 16B of the first tubular member 16 into the space of the tool 3B such that the first and second engaging elements of the tool enter the grooves 18 of the first tubular member 16.

The second drive of the drive mechanism is then operated to rotate the tool 3B in a first rotational direction relative to the first tubular member 16 such that the first and second engaging elements move along the grooves 18 and thus the tool 3B is drawn axially on to the first tubular member 16 until the tool 3B forms a sealed connection over the first tubular member 16. In particular, the second drive of the drive mechanism is operated to exert a third torque on the tool to rotate the tool relative to the first connector 11.

The third torque is less than the predetermined torque level of the clutch mechanism 48. Therefore, accidental opening/closing of the valve 201, for example, if the tool 3B snags or catches on the first tubular member 16, is prevented. In more detail, if the tool 3B snags on the first tubular member 16 during connection of the tool 3B to the first tubular member 16, then the third torque will be exerted on the first tubular member 16 urging the first tubular member 16, and thus the remainder of the first connector 11, to rotate relative to the second connector 12. However, the third torque is less than the predetermined torque level required to slip or disengage the clutch mechanism 48 and thus the first connector 11 remains rotationally fixed relative to the second connector 12 by the clutch mechanism 48, since the clutch plate 49 is engaged with the outer tubular member 28. Moreover, the second connector 12 is rotationally fixed to the valve body 202 since the stop 27A is engaged by the valve 201, and thus the second connector 11 is also rationally fixed to the valve body 202 by virtue of the clutch mechanism 48. The valve body 202 is rotationally fixed relative to the body of the second spacecraft S2 or another component such that the valve body 202 does not rotate relative thereto. Therefore, the first and second connectors 11, 12 are prevented from rotating when the third torque is applied to the first connector 11 and thus the third torque being exerted on the first connector 11 does not cause the actuating member 114 to move in the first axial direction X to engage the opening portion 205 of the valve 201. Thus, accidental opening of the valve 201 during fluid connection of the tool 3B to the valve 201 is prevented, which could otherwise result in the leakage of fluid into space.

Once the tool has been connected to the first connector 11, further rotation of the tool 3B in the first rotational direction relative to the first tubular member 16 is prevented, for instance, by the tool 3B abutting the magnetic member 19 and/or by the engaging elements of the tool 3B reaching the end of the respective grooves 18. The magnetic member 19 helps to retain the tool 3B on the first tubular member 16.

To open the valve 201, the second drive of the drive mechanism is operated to exert a fourth torque on the tool 3B which causes the torque to be exerted on the first tubular member 16 to rotate the first connector 11 in the first rotation direction. The fourth torque is greater than the predetermined torque level of the clutch mechanism 48. Therefore, said operation of the drive mechanism causes the first connector 11 to rotate such that the clutch plate 49 moves axially away from the outer tubular member 28, against the force of the biasing member 55, such that the clutch plate 49 disengages or slips relative to the outer tubular member 28 resulting in rotation of the first connector 11 relative to the second connector 12. The second connector 12 may remain stationary due to the stop 27A of the second connector 12 abutting the valve body 202. The rotation of the first connector 11 causes the internal thread 35 of the second tubular member 17 of the first connector 11 to engage with the external thread 34 of the inner tubular member 27 of the second connector 12 such that the rotation of the first connector 11 relative to the second connector 12 causes the first connector 11 to move in the first axial direction X relative to the second connector 12. This causes the actuating member 214 of the first connector 11 to move in the first axial direction X relative to the second connector 12 such that the longitudinal member 217 of the actuating member 214 moves axially within the central passage 203 of the valve 201 to engage the fluid control member 205 such that the fluid control member 205 is urged in the first axial direction X to open the valve 201.

Once the valve 201 has been opened, fluid can be transferred between the first and second spacecraft, the fluid travelling through the valve 201, coupling 200 and tool 3B. The valve 201 comprises the central passage 203 that allows for fluid to pass through the valve 201. The coupling 200 comprises passage 20, space 21, bore 27, passage 31, aperture 59, and the apertures 219 of the actuating member 214, which facilitate a fluid path through the coupling 200. The tool 3B comprises a conduit (not shown) that allows for fluid to be transferred between the coupling 200 and the first spacecraft.

Optionally, on completion of fluid transfer, the drive mechanism can be operated to rotate the first connector 11 is a second rotational direction, opposite to the first rotational direction. This causes the internal thread 35 of the second tubular member 17 of the first connector 11 to engage with the external thread 34 of the inner tubular member 27 of the second connector 12 such that the rotation of the first connector 11 relative to the second connector 12 causes the first connector 11 to move relative to the second connector 12 in a second axial direction, opposite to the first axial direction X.

This causes the actuating member 214 of the first connector 11 to move in the second axial direction relative to the second connector 12 such that the longitudinal member 214 moves axially away from the central passage 203 and thus the fluid control member 205 is returned to the closed position by the spring to close the valve 201.

The couplings 10, 100, 200 of the first, second and third embodiments described above in reference to FIGS. 1 to 39 share a number of common components, including the first and second tubular members 16, 17 of the first connector 11 and the inner and outer tubular members 27, 28 of the second connector 12. This means that different types of valves 1, 101, 201 can be opened merely by providing a kit of parts and selecting one of the actuation member 14 of the first embodiment; extension member 107 and actuating member 114 of the second embodiment; or, actuation member 214 of the third embodiment, and arranging this with the common components to form the coupling 10, 100, 200 as required. By utilising a number of common components, manufacture of the coupling can be simplified and costs reduced.

In some embodiments, the first torque is lower than the release torque and the second torque is greater than the release torque. In another embodiment, the first and second torques are both higher than the release torque and optionally may be the same. In some embodiments, the third torque is lower than the predetermined torque level of the clutch mechanism and the fourth torque is greater than the predetermined torque level. In some embodiments, the third and fourth torques are less than the first and second torques.

In some embodiments, the total release torque of the locks 13 is around 45 Nm. In some embodiments, predetermined torque level of the clutch mechanism 48 is around 5 Nm. In some embodiments, the first torque is between 1 and 4 Nm and/or the second torque is between 6 and 10 Nm. In some embodiments, the third torque is between 30 and 40 Nm and/or the second torque is between 50 and 60 Nm. However, the skilled person will recognise that these torque values are examples only and that different torque values may be implemented.

In some embodiments, one or more seals (not shown) are provided between the first and second connectors 11, 12 to permit relative movement between the first and second connectors 11, 12 whilst providing a fluid tight seal therebetween. Each seal may comprise, for example, one or more O-rings of a resilient material, for example, rubber.

Each seal may be attached to one of the first and second connectors 11, 12 and abuts the other one of the first and second connectors 11, 12.

In some embodiments (not shown), one of the seals is made of a relatively soft material to seal to said other one of the first and second connectors 11, 12 and the other seal is made of a harder seal to provide support that protects the softer seal. In one such embodiment, the first, second and third seals (not shown) are provided between the first and second connectors 11, 12. The seals are adjacent and the second seal is located between the first and third seals. The first and third seals are made of a softer material and the second seal is made of a harder material. The soft and hard seals may be made of different types of rubber with or plastics that have different hardness.

Figure 1:
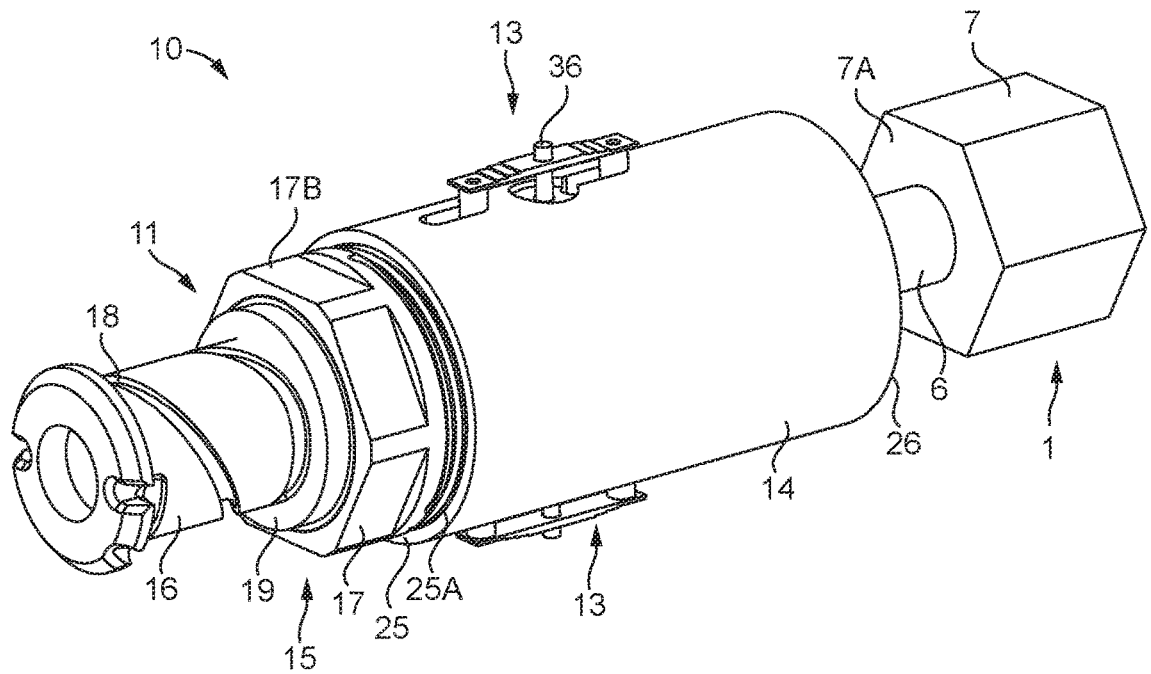
FIG. 1 is a first perspective view of a coupling according to a first embodiment.
Figure 2:
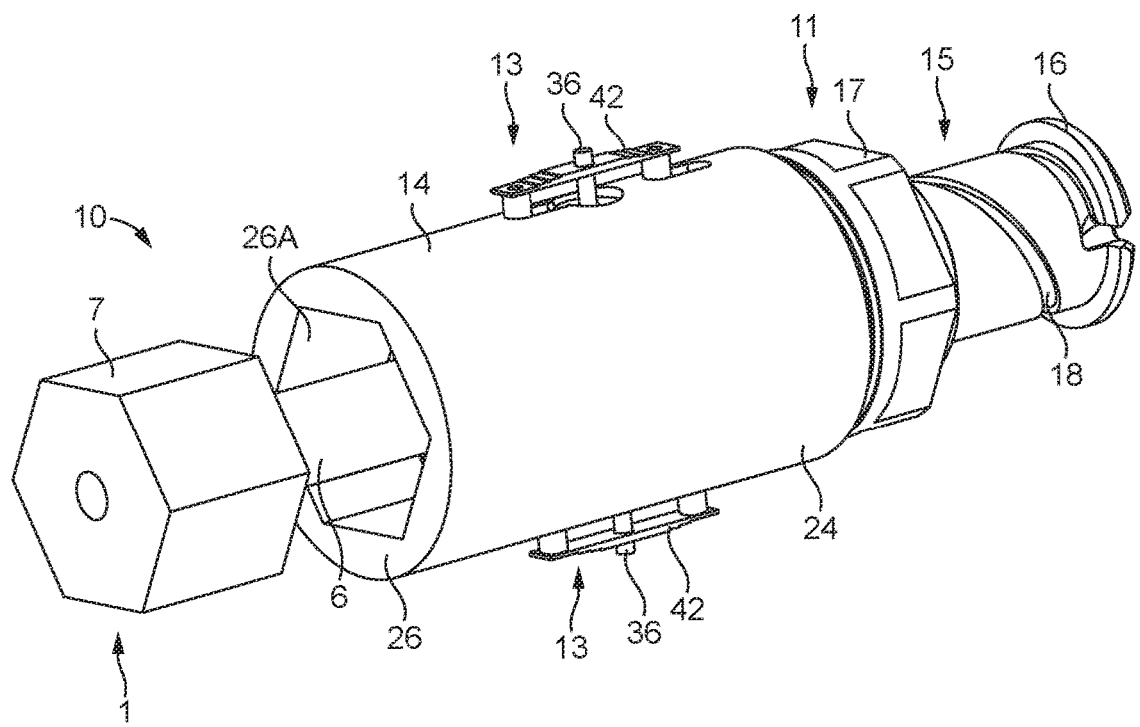
FIG. 2 is a second perspective view of the coupling of FIG. 1.
Figure 3:
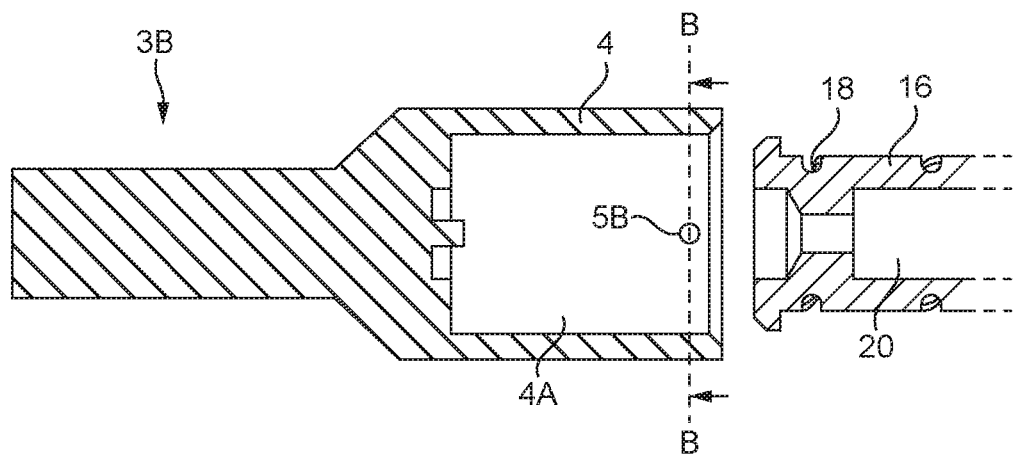
FIG. 3 is a cross-sectional side view showing a tool of a drive mechanism of a first spacecraft, and part of a first connector of the coupling of FIG. 1.
Figure 3B:
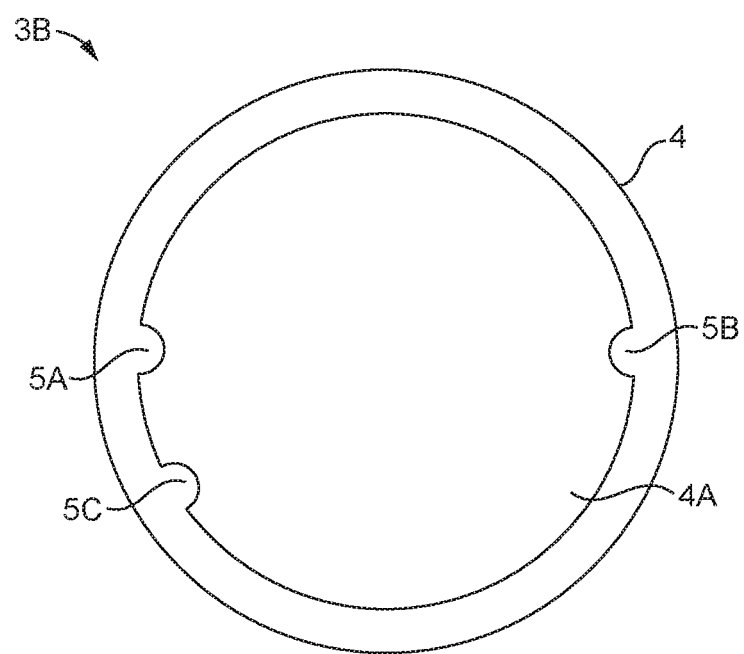
FIG. 3B is a cross-sectional front view of the tool of FIG. 3, along line B-B.
Figure 4:
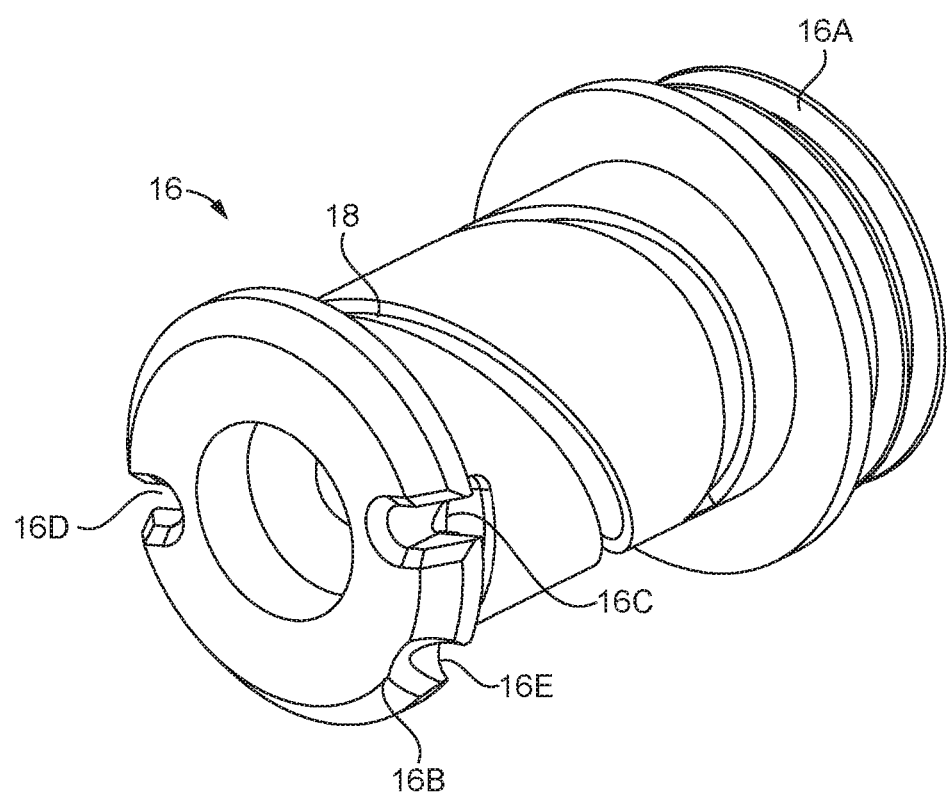
FIG. 4 is a perspective view of a first tubular member of the coupling of FIG. 1.
Figure 5:
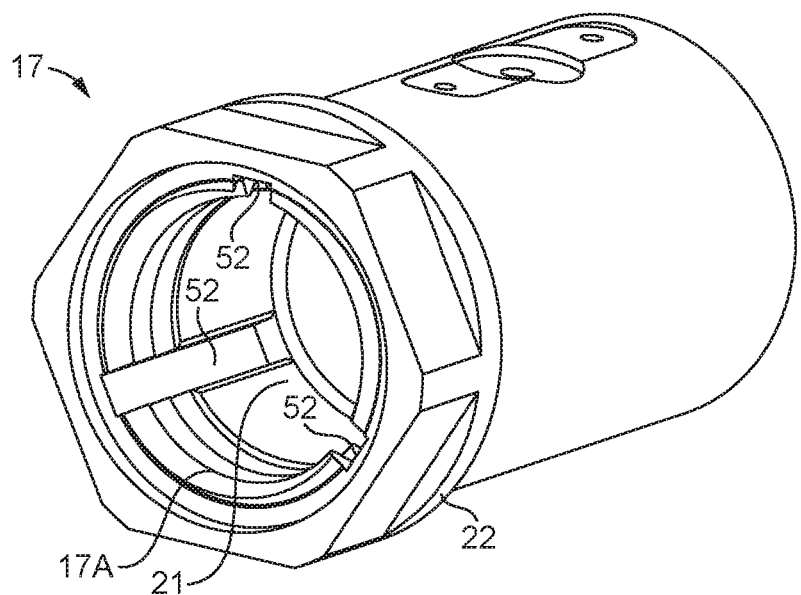
FIG. 5 is a first perspective view of a second tubular member of the coupling of FIG. 1.
Figure 6:
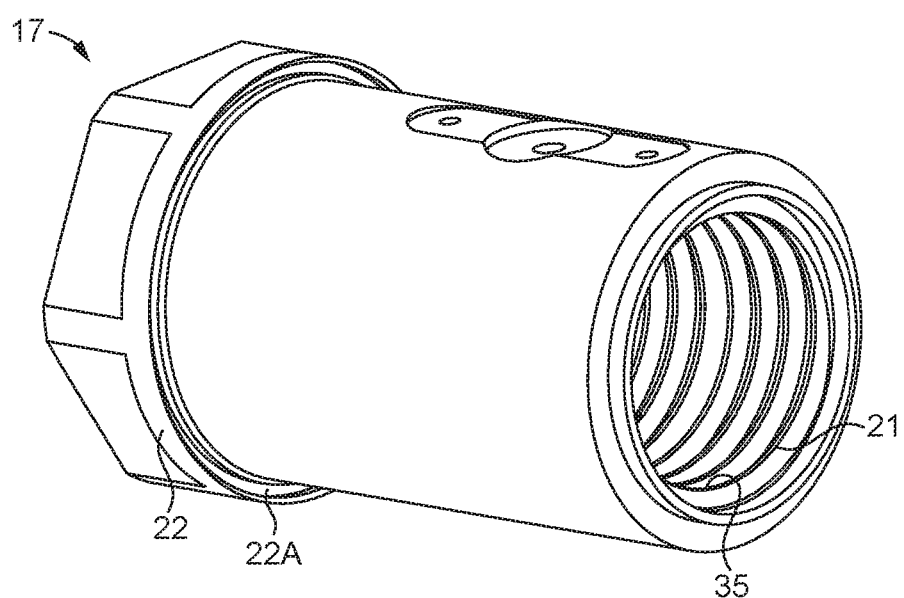
FIG. 6 is a second perspective view of the second tubular member of the coupling of FIG. 1.
Figure 7:
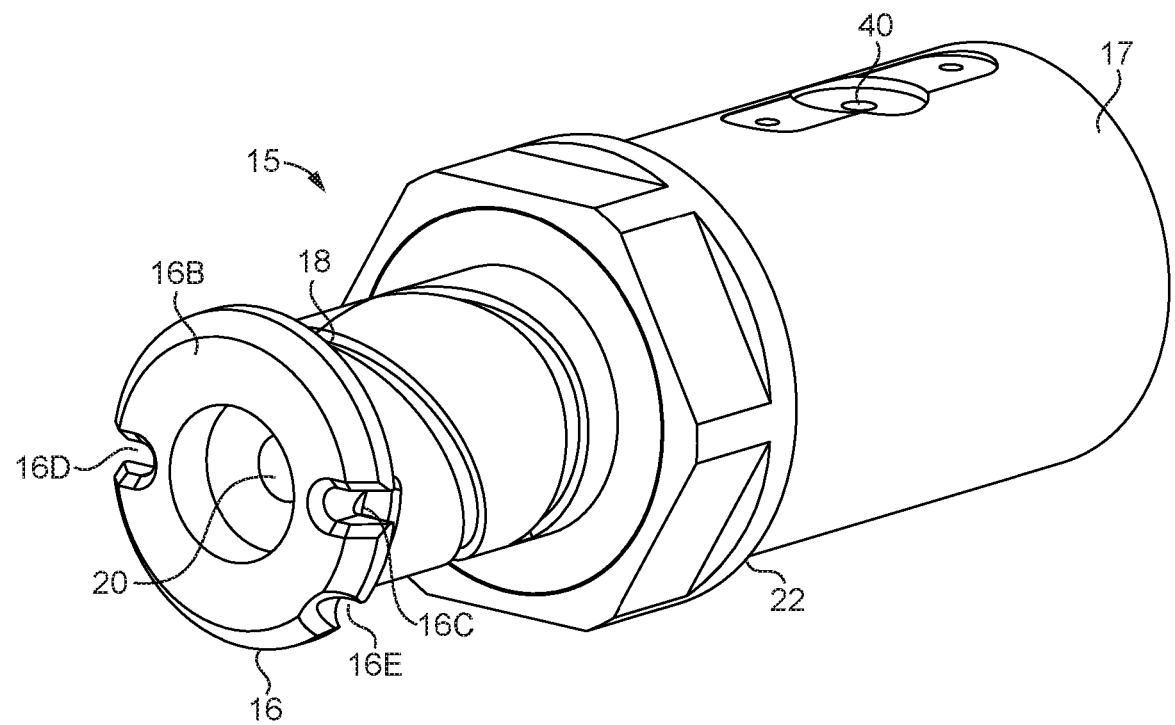
FIG. 7 is a perspective view of a coupling member of the coupling of FIG. 1, comprising the first and second tubular members.
Figure 8:
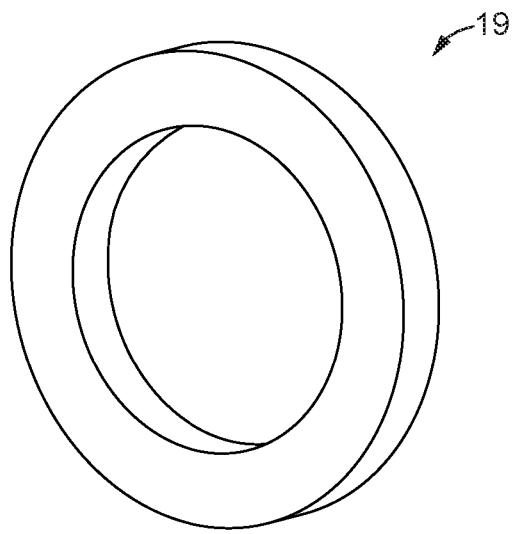
FIG. 8 is a perspective view of a fastener of the coupling of FIG. 1.
Figure 9:
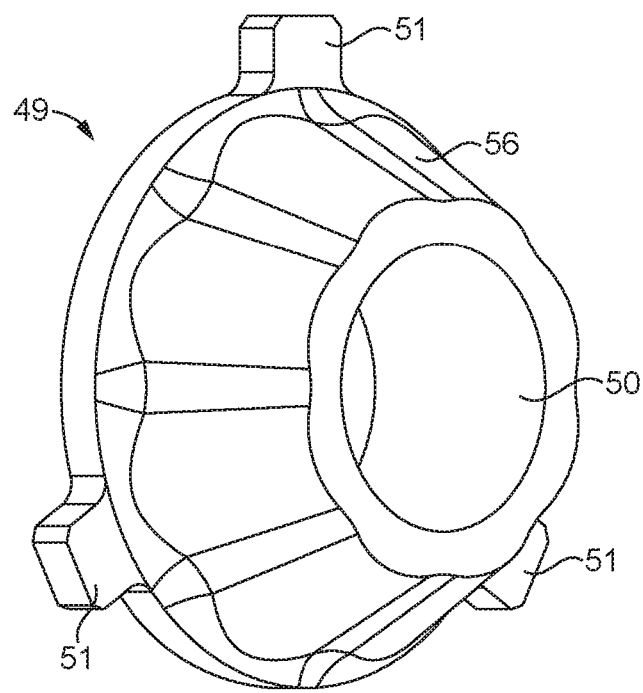
FIG. 9 is a first perspective view of a clutch plate of the coupling of FIG. 1.
Figure 10:
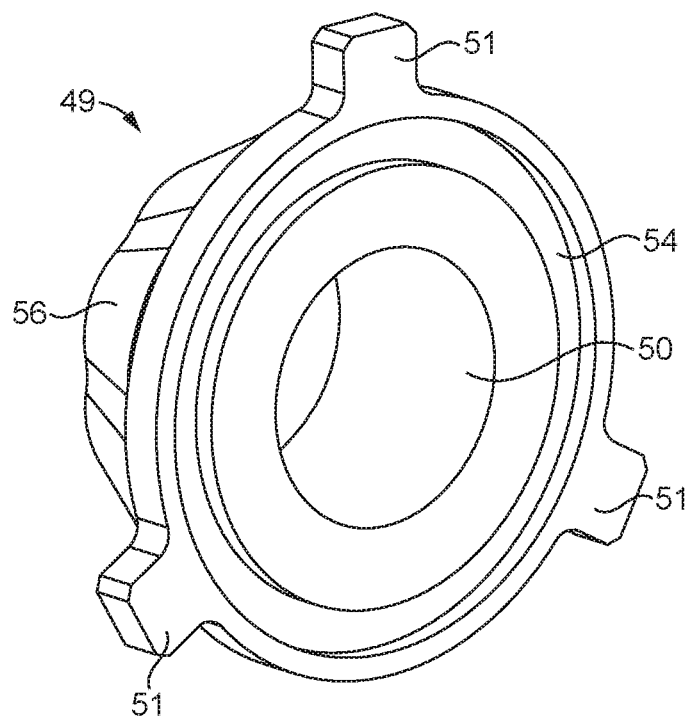
FIG. 10 is a second perspective view of the clutch plate of the coupling of FIG. 1.
Figure 11:
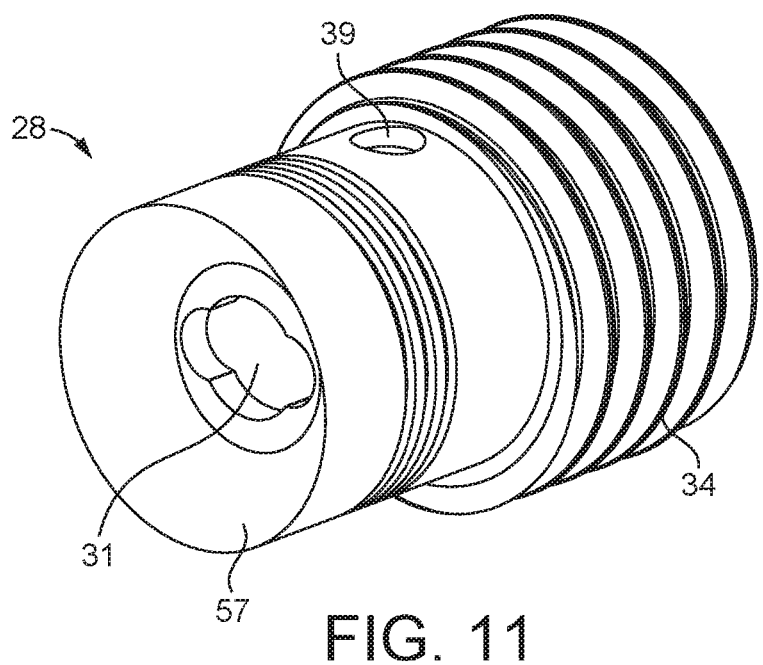
FIG. 11 is a first perspective view of an outer tubular member of the coupling of FIG. 1.
Figure 12:
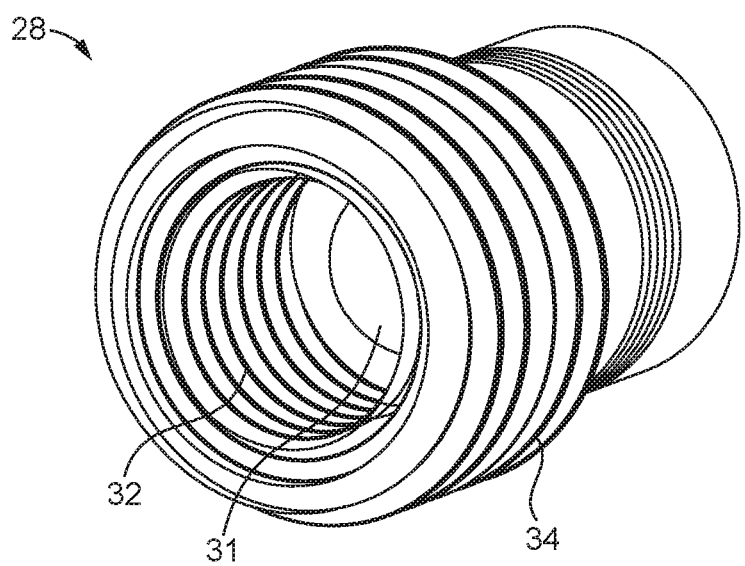
FIG. 12 is a second perspective view of the outer tubular member of the coupling of FIG. 1.
Figure 13:
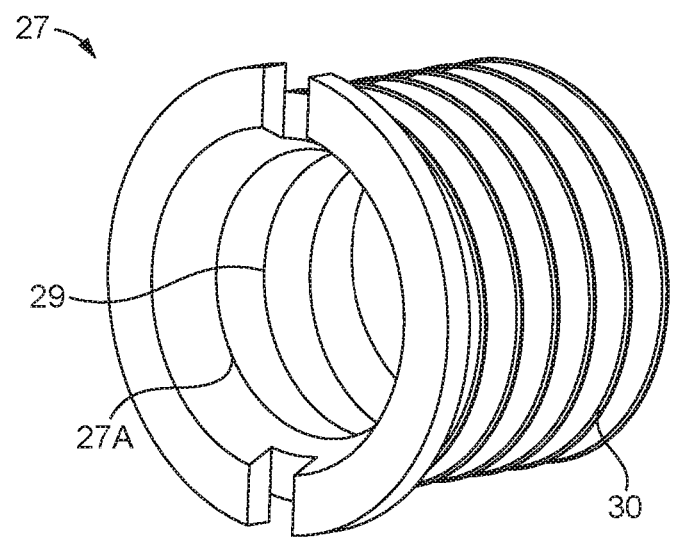
FIG. 13 is a perspective view of an inner tubular member of the coupling of FIG. 1.
Figure 14:
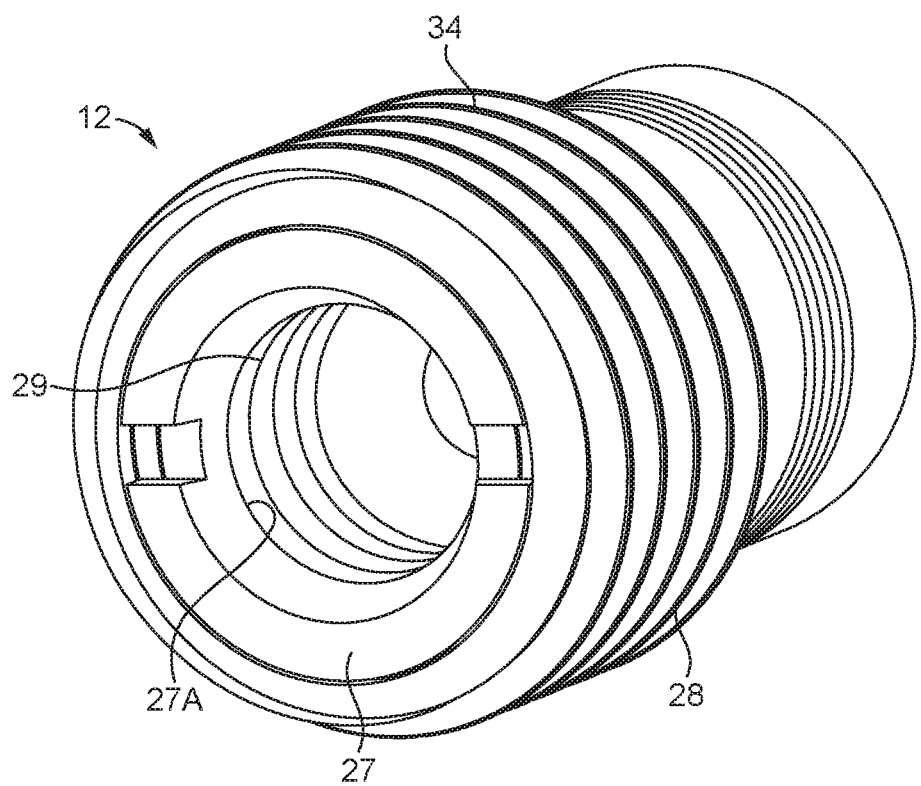
FIG. 14 is a perspective view of a second connector of the coupling of FIG. 1, comprising the inner and outer tubular members.
Figure 15:
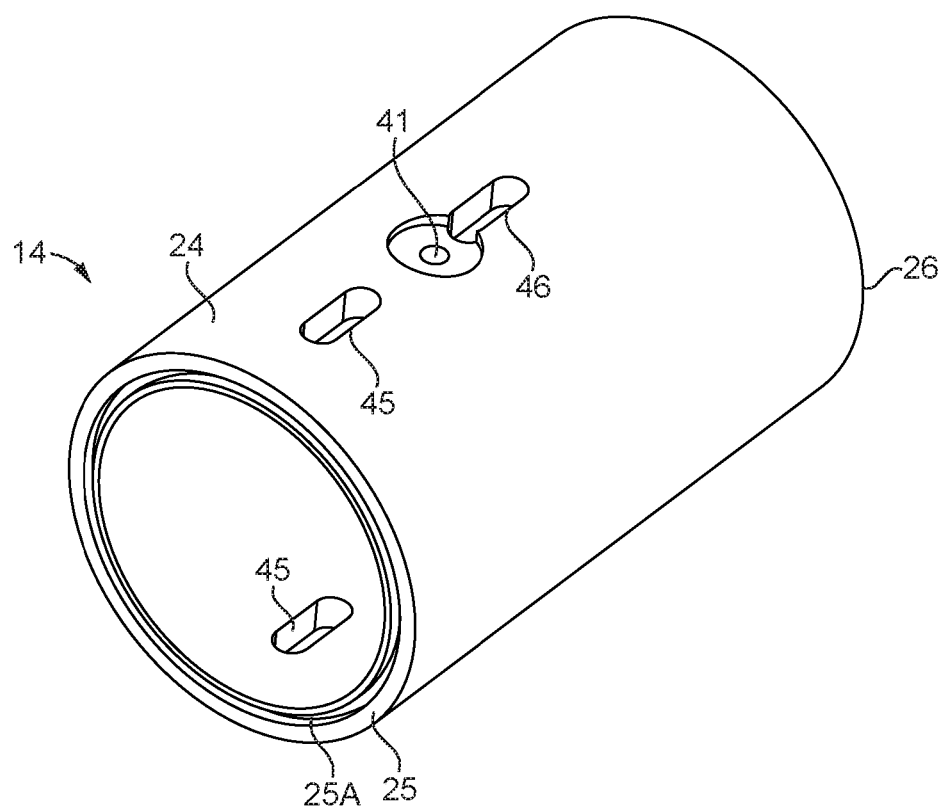
FIG. 15 is a perspective view of an actuating member of the coupling of FIG. 1.
Figure 16:
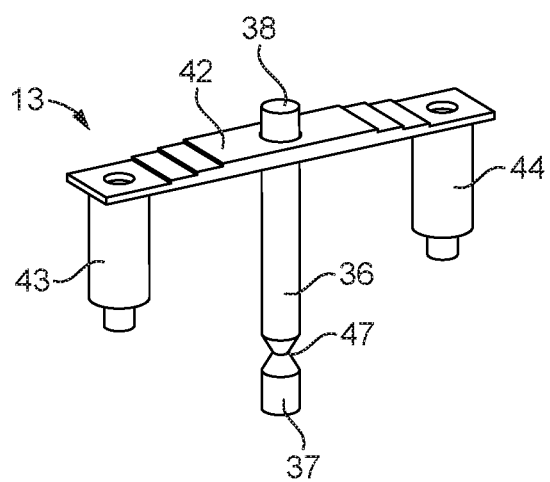
FIG. 16 is a perspective view of a lock of the coupling of FIG. 1.
Figure 17:
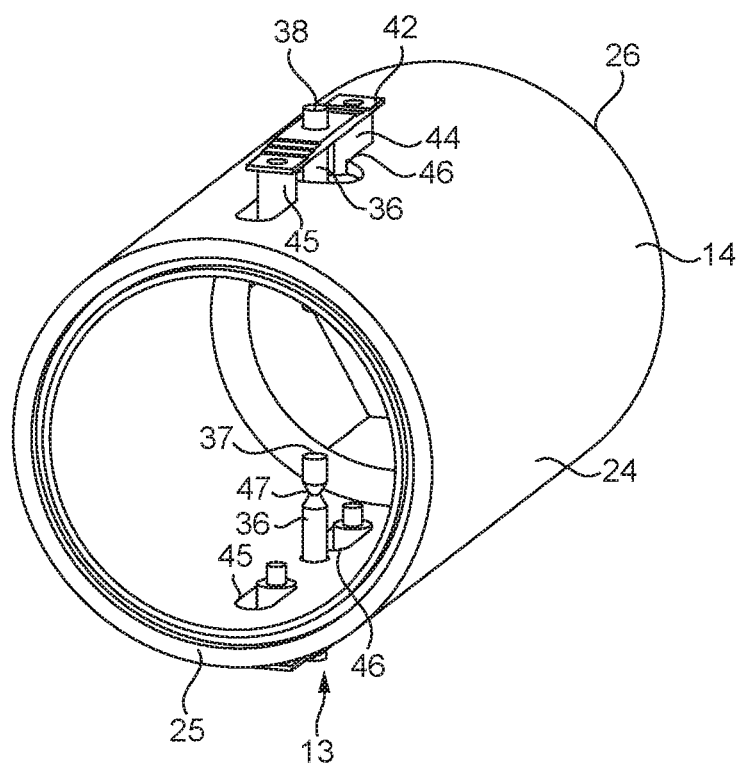
FIG. 17 is a perspective view of the actuating member and lock of the coupling of FIG. 1, with the lock in a locked state.
Figure 18:
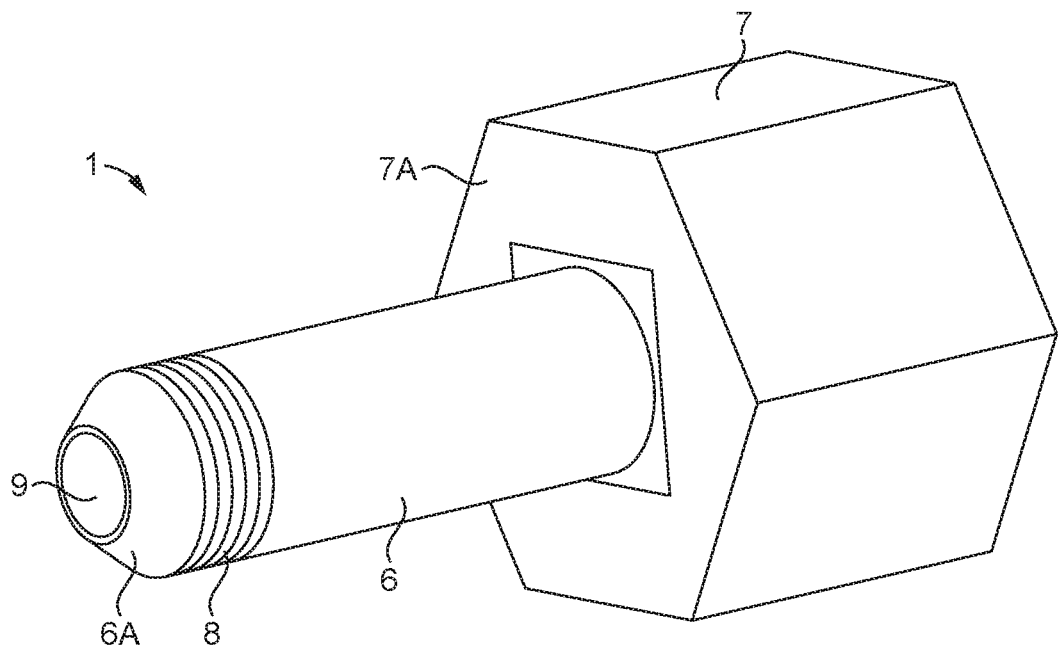
FIG. 18 is a perspective view of a valve of a second spacecraft, the coupling of FIG. 1 configured to couple to and open the valve.
Figure 19:
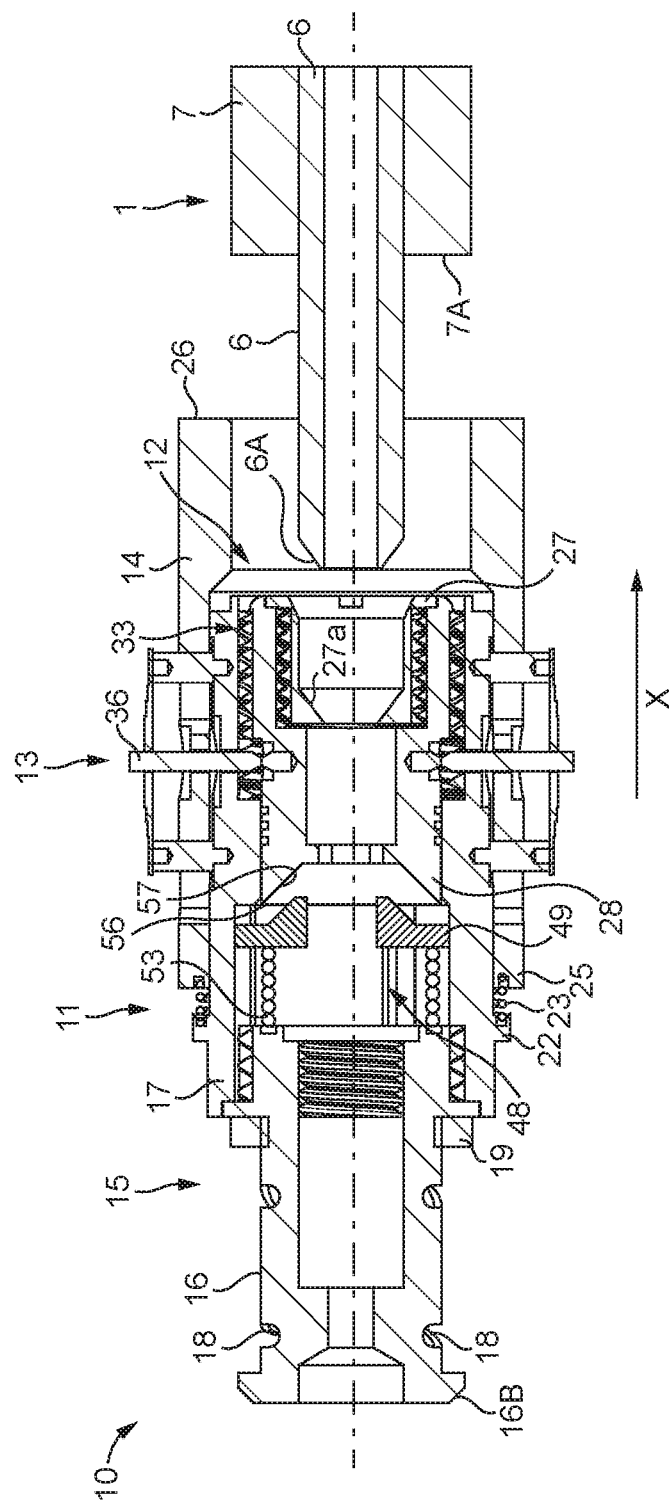
FIG. 19 is a cross-sectional side view of the coupling of FIG. 1 and the valve of FIG. 18.

In some embodiments, the or each seal is received in a respective groove 28D in one of the first and second connectors 11, 12 (see FIG. 11).

In some embodiments, operation of the coupling 10, 100, 200 is visually inspected by a camera to determine each stage of operation, for instance, to determine one or more of: when the second connector 12 has been screwed on to the valve 1, 101, 201; when the lock 13 has moved to the unlocked state; when the tool 3B has been connected to the coupling member 15; and, when the opening portion 7, 105, 205 of the valve 1, 101, 201 has been moved to open the valve 1, 101, 201. Additionally, or alternatively, one or more torque or force sensors may be used to determine each stage of operation. For example, a torque sensor may detect the amount of force applied by the drive mechanism 2 and also a reactive torque. For instance, in one exemplary embodiment, when the second connector 12 is being screwed onto the valve 1, 101, 201 the reactive torque will be low or substantially zero because the second connector 12 rotates freely relative to the valve 1, 101, 201. Once the stop portion 27A is engaged, the reactive force will increase. Similarly, when the tool 3B is being connected to the first connector 11, the reactive torque will be low or substantially zero because the tool 3B rotates freely relative to the coupling member 15. Once the tool 3B is properly connected to the coupling member 15, for example, the engaging elements 5A, 5B reaching the end of the grooves 18 and/or the tool 3B abutting the fastener 19, the reactive torque will increase. Thus, the measured torques/forces can be used to determine the current operating condition of the coupling 10, 100, 200.

Figure 40:
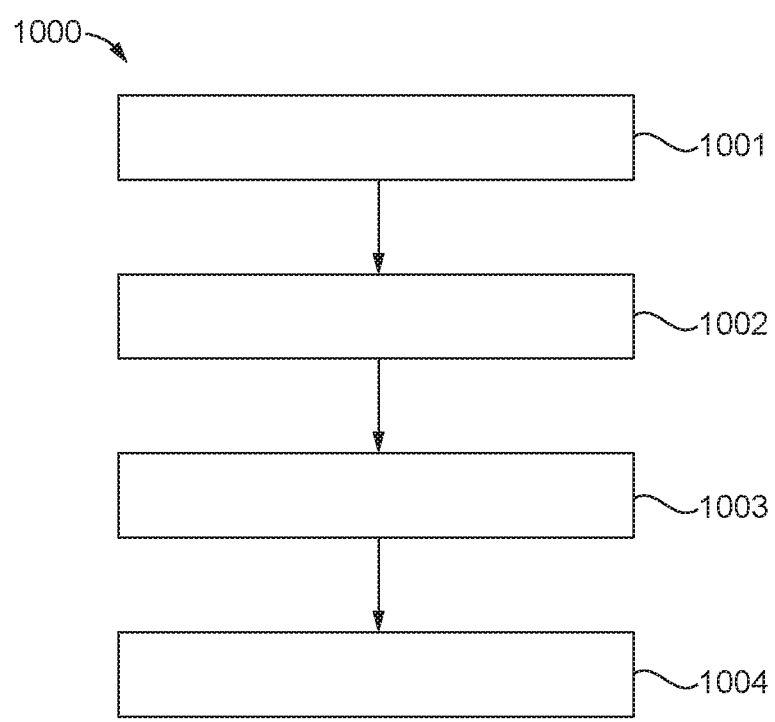

Referring now to FIG. 40, a flow diagram depicting an exemplary method 1000 of fluidly connecting first and second spacecraft S1, S2 using a coupling 10, 100, 200 is shown.

The method comprises a first step 1001 of connecting the second connector 12 to the valve 1, 101, 201 by operating the drive mechanism 2 with the lock 13 in the locked state to rotate the coupling member 15 and the second connector 12 together such that the bore 29 second connector 12 is screwed on to the valve 1, 101, 201 until the stop portion 27A engages the valve 1, 101, 201.

The method 1000 comprises a second step 1002 of moving the lock 13 to the unlocked state by operating the drive mechanism 2 to exert a torque on the coupling member 15 that is greater than a predetermined torque level such that the actuating member 14, 114, 214 is moveable relative to the second connector 12 to engage the valve 1, 101, 201.

In some embodiments, the step 1001 of connecting the second connector 12 to the valve 1, 101, 201 comprises operating the drive mechanism 2 to exert a torque on the coupling member 15 that is less than the predetermined torque level.

In some embodiments, the method 1000 comprises a third step 1003 of fluidly connecting the tool 3B to the coupling member 15 by exerting a torque on the tool 3B that is less than the second predetermined torque level until the tool 3B is coupled to the coupling member 15.

In some embodiments, the method 1000 comprises a fourth step 1004 of exerting a torque on the tool 3B that is greater than the second predetermined torque level to rotate the coupling member 15 relative to the second connector 12 to open the valve 1, 101, 201.

In an alternative embodiment (not shown), the clutch mechanism is omitted and, instead, during the step of connecting the tool 3B to the coupling member 15, the opening portion 7, 105, 205 of the valve 1, 101, 201 is held stationary to prevent accidental opening of the valve 1, 101, 201. For example, the actuating arm 3A may grip the opening portion 7 of the valve 1 to prevent accidental turning of the opening portion 7 during connection of the tool 3B.

In the above described embodiments, the second connector 12 comprises a threaded bore 29 configured to engage with the thread on the valve. However, it should be recognised that the second connector 12 may have an alternative configuration for allowing the second connector 12 to be screwed on to the valve, for instance, a bayonet connection. In one embodiment, the one of the valve and second connector comprises a spiral groove and the other one of the valve and second connector comprises a protrusion that is received in the spiral groove to allow for the second connector to be screwed on the valve with the protrusion moving along the groove.

In order to address various issues and advance the art, the entirety of this disclosure shows by way of illustration various embodiments in which the claimed invention(s) may be practiced and provide for a superior coupling for fluidly connecting first and second spacecraft, and a kit of parts for a coupling. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. A coupling assembly for fluidly connecting first and second spacecraft, the first spacecraft comprising a drive mechanism and the second spacecraft comprising a valve for filling and/or draining the second spacecraft, the coupling assembly comprising:
   a first connector comprising an actuating member configured to engage and open the valve and a coupling member configured to couple to the drive mechanism such that the drive mechanism is operable to exert a torque on the coupling member to rotate the coupling member;
   a second connector comprising a stop portion and a bore for transferring fluid, the second connector configured to screw on to the valve until the stop portion engages the valve; and,
   at least one lock configured such that, in use, the at least one lock is initially in a locked state wherein the coupling member is rotationally fixed relative to the second connector such that operation of the drive mechanism rotates the coupling member and the second connector together such that the second connector is screwed on to the valve until the stop portion engages the valve, the actuating member being prevented from moving relative to the second connector to engage and open the valve whilst the at least one lock is in the locked state, and wherein the at least one lock is configured such that, once the stop portion engages the valve, operation of the drive mechanism to exert a torque on the coupling member that is greater than a predetermined torque level moves the at least one lock to an unlocked state wherein the actuating member is moveable relative to the second connector to engage and open the valve.

2. The coupling assembly according to claim 1, wherein when the at least one lock is moved to the unlocked state operation of the drive mechanism rotates the first connector relative to the second connector such that the actuating member moves axially towards the valve.

3. The coupling assembly according to claim 2, wherein the first connector is coupled to the second connector via an interface configured such that rotation of the first connector relative to the second connector causes axial movement of the first connector towards the valve such that the actuating member engages the valve.

4. The coupling assembly according to claim 1, wherein the at least one lock includes a frangible member.

5. The coupling assembly according to claim 4, wherein the at least one lock further comprises a biasing member configured to bias at least a portion of the frangible member radially.

6. The coupling assembly according to claim 1, further comprising a biasing member configured to bias the actuating member axially towards the valve.

7. The coupling assembly according to claim 6, wherein when the at least one lock is in the locked state the actuating member is axially fixed relative to the coupling member and when the at least one lock is in the unlocked state the biasing member is configured to move the actuating member axially towards the valve.

8. The coupling assembly according to claim 6, wherein when the at least one lock is in the locked state a portion of the second connector engages the actuating member to restrict axial movement of the actuating member, and wherein when the at least one lock is in the unlocked state the actuating member is rotatable relative to the second connector such that the actuating member moves out of engagement with said portion of the second connector and is moved axially towards the valve by the biasing member.

9. The coupling assembly according to claim 1, wherein the valve includes an opening portion that is rotatable to open the valve, and wherein the actuating member is configured to engage the opening portion such that the actuating member is rotationally fixed relative to the opening portion such that rotation of the first connector by the drive mechanism opens the valve.

10. The coupling assembly according to claim 9, wherein the actuating member comprises a sleeve configured to receive a part of the valve when the actuating member engages the valve and/or at least a portion of the actuating member is configured to be received within the valve to engage the valve.

11. The coupling assembly according to claim 1, wherein the valve includes an opening portion that is moveable axially to open the valve, and wherein the actuating member is configured to engage the opening portion and move the opening portion axially to open the valve.

12. The coupling assembly according to claim 1, further comprising a clutch mechanism configured such that above a second predetermined torque level must be exerted on the coupling member by the drive mechanism to rotate the coupling member relative to the second connector.

13. The coupling assembly according to claim 12, wherein the clutch mechanism comprises a clutch member that is slidably arranged with one of the first and second connectors and engages the other one of the first and second connectors to resist rotation between the coupling member and the second connector and, wherein the clutch mechanism comprises a biasing member that is configured to urge the clutch member against said other one of the first and second connectors.

14. A kit of parts for a coupling for fluidly connecting first and second spacecraft, the first spacecraft comprising a drive mechanism and the second spacecraft comprising a valve for filling and/or draining the second spacecraft, the kit of parts comprising:
- a set of two or more actuating members configured to engage and open different types of valve;
- a coupling member configured to couple to the drive mechanism such that the drive mechanism is operable to rotate the coupling each actuating member configured to be attached to the coupling member such that the actuating member and coupling member form a first connector;
- a second connector comprising a stop portion and a bore for transferring fluid, the second connector configured to screw on to the valve until the stop portion engages the valve; and,
- at least one lock configured such that, when the coupling is assembled and is in use, the at least one lock is initially in a locked state wherein the coupling member is rotationally fixed relative to the second connector such that operation of the drive mechanism rotates the coupling member and the second connector together such that the second connector is screwed on to the valve until the stop portion engages the valve, the actuating member being prevented from moving relative to the second connector to engage and open the valve whilst the at least one lock is in the locked state, and wherein once the stop portion engages the valve operation of the drive mechanism to exert a torque on the coupling member that is greater than a predetermined torque level moves the at least one lock to an unlocked state wherein the actuating member is moveable relative to the second connector to engage and open the valve.

15. A method of fluidly connecting first and second spacecraft using a coupling, the first spacecraft comprising a drive mechanism and the second spacecraft comprising a valve for filling and/or draining the second spacecraft, the coupling comprising:
- a first connector comprising an actuating member configured to engage and open the valve and a coupling member configured to couple to the drive mechanism such that the drive mechanism is operable to exert a torque on the coupling member to rotate the coupling member;
- a second connector comprising a stop portion and a bore for transferring fluid, the second connector configured to screw on to the valve until the stop portion engages the valve; and,
- at least one lock configured such that, in use, the at least one lock is initially in a locked state wherein the coupling member is rotationally fixed relative to the second connector, the actuating member being prevented from moving relative to the second connector to engage and open the valve, the method comprising:
- connecting the second connector to the valve by operating the drive mechanism with the at least one lock in the locked state to rotate the coupling member and the second connector together such that the second connector is screwed on to the valve until the stop portion engages the valve; and then,
- moving the at least one lock to the unlocked state by operating the drive mechanism to exert a torque on the coupling member that is greater than a predetermined torque level such that the actuating member is moveable relative to the second connector to engage the valve.

\* \* \* \* \*